(12) United States Patent
Ogata et al.

(10) Patent No.: US 10,054,221 B2
(45) Date of Patent: Aug. 21, 2018

(54) HYDRAULIC CONTROL DEVICE OF BELT-TYPE CONTINUOUSLY VARIABLE TRANSMISSION

(71) Applicants: Yusuke Ogata, Miyoshi (JP); Yoshihiro Mizuno, Nisshin (JP); Yasuyuki Watanabe, Toyota (JP); Masashi Hattori, Anjo (JP); Junichi Tokunaga, Anjo (JP); Toshiaki Hayashi, Anjo (JP)

(72) Inventors: Yusuke Ogata, Miyoshi (JP); Yoshihiro Mizuno, Nisshin (JP); Yasuyuki Watanabe, Toyota (JP); Masashi Hattori, Anjo (JP); Junichi Tokunaga, Anjo (JP); Toshiaki Hayashi, Anjo (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 501 days.

(21) Appl. No.: 14/784,364

(22) PCT Filed: Apr. 18, 2014

(86) PCT No.: PCT/IB2014/000578
§ 371 (c)(1),
(2) Date: Oct. 14, 2015

(87) PCT Pub. No.: WO2014/170743
PCT Pub. Date: Oct. 23, 2014

(65) Prior Publication Data
US 2016/0061318 A1 Mar. 3, 2016

(30) Foreign Application Priority Data
Apr. 19, 2013 (JP) .................................. 2013-088260

(51) Int. Cl.
*F16H 61/02* (2006.01)
*F16H 9/16* (2006.01)
*F16H 61/662* (2006.01)
*F16H 61/66* (2006.01)

(52) U.S. Cl.
CPC .......... *F16H 61/0265* (2013.01); *F16H 9/16* (2013.01); *F16H 61/662* (2013.01); *F16H 61/66259* (2013.01); *F16H 2061/6605* (2013.01)

(58) Field of Classification Search
CPC ...... F16H 61/0265; F16H 9/16; F16H 61/662; F16H 61/66259; F16H 2061/6605; F16H 9/00
(Continued)

(56) References Cited

U.S. PATENT DOCUMENTS

| | | | | |
|---|---|---|---|---|
| 4,685,357 | A | * | 8/1987 | Sawada ............. F16H 61/66272 477/45 |
| 5,674,150 | A | * | 10/1997 | Morishita ............... F16H 61/16 192/3.63 |

(Continued)

FOREIGN PATENT DOCUMENTS

| | | |
|---|---|---|
| EP | 0 727 598 A2 | 8/1996 |
| JP | 62-28561 A | 2/1987 |

(Continued)

*Primary Examiner* — William E Dondero
*Assistant Examiner* — Mark K Buse
(74) *Attorney, Agent, or Firm* — Finnegan, Henderson, Farabow, Garrett & Dunner, LLP

(57) ABSTRACT

In a hydraulic control device of a belt-type continuously variable transmission that includes: a first hydraulic actuator that is provided in a primary pulley and reduces a width of a belt groove when hydraulic pressure is applied thereto; and a first control valve that regulates predetermined source pressure to be gear-change hydraulic pressure for setting or changing a gear change ratio and outputs the gear-change hydraulic pressure to the first hydraulic actuator, gear change equipment is included that regulates the source pressure to be the gear-change hydraulic pressure so as to regulate the hydraulic pressure of the first hydraulic actuator (Continued)

when the hydraulic pressure of the first hydraulic actuator is rapidly changed to change the width of the belt groove.

16 Claims, 10 Drawing Sheets

(58) Field of Classification Search
USPC .......................................................... 474/28
See application file for complete search history.

(56) References Cited

U.S. PATENT DOCUMENTS

| | | | |
|---|---|---|---|
| 5,720,691 A * | 2/1998 | Ogawa | F16H 61/66259 474/28 |
| 6,110,062 A | 8/2000 | Fujikawa | |
| 7,713,165 B2 * | 5/2010 | Kim | F16H 61/66259 477/115 |
| 8,051,652 B2 * | 11/2011 | Muller | F16D 25/123 60/430 |
| 8,894,521 B2 * | 11/2014 | Tsukuda | F16H 61/66272 474/18 |
| 2010/0151977 A1 * | 6/2010 | Ogata | F16H 61/12 474/28 |
| 2012/0035009 A1 * | 2/2012 | Mano | F16H 61/0021 474/28 |

FOREIGN PATENT DOCUMENTS

| | | |
|---|---|---|
| JP | 11-247981 | 9/1999 |
| JP | 2006-207678 A | 8/2006 |

* cited by examiner

HYDRAULIC CONTROL DEVICE OF BELT-TYPE CONTINUOUSLY VARIABLE TRANSMISSION

CROSS-REFERENCE TO RELATED APPLICATIONS

This application is a national phase application of International Application No. PCT/IB2014/000578, filed Apr. 18, 2014, and claims the priority of Japanese Application No. 2013-088260, filed Apr. 19, 2013, the content of both of which is incorporated herein by reference.

BACKGROUND OF THE INVENTION

1. Field of the Invention

The present invention relates to a belt-type continuously variable transmission that controls a gear change ratio by changing a winding radius of a belt wound around a pair of pulleys. Particularly, the present invention relates to a hydraulic control device of a belt-type continuously variable transmission that changes a gear change ratio by controlling hydraulic pressure of a hydraulic actuator attached to a pulley.

2. Description of Related Art

A following belt-type continuously variable transmission has been known as related art. The belt-type continuously variable transmission controls a gear change ratio by changing a winding radius of a belt that is wound around a primary pulley and a secondary pulley. The winding radius of the belt wound around the primary pulley and the secondary pulley is changed by controlling hydraulic pressure or an amount of oil of a hydraulic actuator that is attached to the primary pulley or the secondary pulley. In addition, in the belt-type continuously variable transmission that includes the hydraulic actuator attached to each of the pulleys and a control valve for controlling the hydraulic pressure or the amount of oil of the hydraulic actuator, the gear change ratio is controlled by supplying the oil to or discharging the oil from the hydraulic actuator. The hydraulic actuator pressurizes or depressurizes the oil by electrically controlling a solenoid valve that applies signal pressure to the control valve.

A belt-type continuously variable transmission disclosed in Japanese Patent Application Publication No. 11-247981 (JP 11-247981 A) is provided with a hydraulic actuator for each pulley to change a gear change ratio or a transmission torque capacity. The gear change ratio or the transmission torque capacity is changed by controlling hydraulic pressure of the each hydraulic actuator. More specifically, a spool-type hydraulic pressure control valve on which signal pressure output from a solenoid valve and feedback pressure of the hydraulic actuator are exerted is provided in an oil passage that communicates with the each hydraulic actuator. The hydraulic pressure of the each hydraulic actuator is controlled by controlling output pressure of the solenoid valve. In addition, in the belt-type continuously variable transmission disclosed in JP 11-247981 A, the output pressure of the solenoid valve that controls the hydraulic pressure of the primary pulley is lowered for a downshift, while the output pressure of the solenoid valve is increased for an upshift.

The hydraulic pressure control valve of JP 11-247981 A is a spool-type pressure regulator valve. The pressure regulator valve is opened or closed in accordance with the signal pressure and the feedback pressure. When the pressure regulator valve lowers the hydraulic pressure of the hydraulic actuator, the hydraulic pressure of the hydraulic actuator is lowered after the hydraulic pressure near the pressure regulator valve is lowered. Accordingly, there is a possibility that the feedback pressure exerted on a spool becomes lower than the hydraulic pressure of the hydraulic actuator. In addition, because the spool is moved on the basis of the feedback pressure and the signal pressure, there is a possibility that an opening area of the pressure regulator valve is reduced, thereby reducing a flow rate of oil to be discharged. In other words, when the hydraulic pressure of the hydraulic actuator is controlled by the hydraulic pressure control valve that regulates and outputs predetermined source pressure, there is a possibility that a change rate to increase or lower the hydraulic pressure of the hydraulic actuator is lowered. Therefore, a gear change speed for changing the gear change ratio may become slow.

SUMMARY OF THE INVENTION

The present invention provides a hydraulic control device of a belt-type continuously variable transmission that can increase a gear change speed when a hydraulic pressure control valve controls hydraulic pressure of a hydraulic actuator for a gear change.

In a hydraulic control device of a belt-type continuously variable transmission according to a first aspect of the present invention includes: paired pulleys, each having a belt groove around which a belt is wound; a first hydraulic actuator that is provided to either, one of the paired pulleys and reduces a width of the belt groove when hydraulic pressure is applied thereto; a hydraulic pressure control valve that regulates predetermined source pressure to be gear-change hydraulic pressure for setting or changing a gear change ratio and outputs the gear-change hydraulic pressure to the first hydraulic actuator; and gear change equipment that applies a hydraulic pressure to or lowers a hydraulic pressure of the first hydraulic actuator without regulating the source pressure to be the gear-change hydraulic pressure by the hydraulic pressure control valve when the hydraulic pressure of the first hydraulic actuator is changed rapidly to change the width of the belt groove in the one pulley.

In the hydraulic control device of the belt-type continuously variable transmission according to the first aspect of the present invention, the hydraulic pressure of the first hydraulic actuator may be changed rapidly when a speed to change the gear change ratio is improved.

In the hydraulic control device of the belt-type continuously variable transmission according to the first aspect of the present invention, the hydraulic pressure control valve includes a first pressure regulator valve that applies the hydraulic pressure to or lowers the hydraulic pressure of the first hydraulic actuator in accordance with first signal pressure and feedback pressure of the first hydraulic actuator that are applied thereto, and the gear change equipment may include signal pressure applying equipment that exerts second signal pressure in a direction to increase or lower the feedback pressure applied to the first pressure regulator valve and applies the hydraulic pressure to or lowers the hydraulic pressure of the first hydraulic actuator without regulating the source pressure to be the gear-change hydraulic pressure by the hydraulic pressure control valve.

In the hydraulic control device of the belt-type continuously variable transmission according to the first aspect of the present invention, the signal pressure applying equipment may include a first switching valve that is configured to rapidly change the hydraulic pressure of the first hydraulic actuator so as to change the width of the belt groove in the one pulley and thereby switch a communicated oil passage to exert the second signal pressure on the first pressure regulator valve.

The hydraulic control device of the belt-type continuously variable transmission according to the first aspect of the present invention further includes: a first clutch that can be engaged even when power transmission between a power source and a drive wheel is blocked; and a first control valve that outputs fourth signal pressure for engaging the first clutch. The first switching valve may exert the second signal pressure on the first pressure regulator valve when the fourth signal pressure is increased.

In the hydraulic control device of the belt-type continuously variable transmission according to the first aspect of the present invention, the first switching valve may exert the second signal pressure on the first pressure regulator valve in accordance with the first signal pressure and the fourth signal pressure.

In the hydraulic control device of the belt-type continuously variable transmission according to the first aspect of the present invention, the first clutch may include a second clutch that is engaged during start of a vehicle and allows power transmission between the power source and the drive wheel without interposing the belt therebetween.

The hydraulic control device of the belt-type continuously variable transmission according to the first aspect of the present invention further includes: a third clutch that is engaged and allows power transmission between the power source and the drive wheel; and a second control valve that outputs fifth signal pressure for engaging the third clutch. The first switching valve may exert the second signal pressure on the first pressure regulator valve when the fifth signal pressure is lowered.

The hydraulic control device of the belt-type continuously variable transmission according to the first aspect of the present invention includes: a second hydraulic actuator that is provided in another pulley of the paired pulleys and reduces the width of the belt groove when the hydraulic pressure is applied thereto; and a third control valve that outputs sixth signal pressure for controlling hydraulic pressure of the second hydraulic actuator. The first switching valve may exert the second signal pressure on the first pressure regulator valve in accordance with the fifth signal pressure and the sixth signal pressure.

In the hydraulic control device of the belt-type continuously variable transmission according to the first aspect of the present invention, the first switching valve may exert the second signal pressure on the first pressure regulator valve in accordance with the first signal pressure, the fifth signal pressure, and the sixth signal pressure.

In the hydraulic control device of the belt-type continuously variable transmission according to the first aspect of the present invention, the gear change equipment may include a second switching valve that is provided in a first oil passage communicated with the hydraulic pressure control valve and the first hydraulic actuator, and that, when the hydraulic pressure of the first hydraulic actuator is changed rapidly to change the width of the belt groove in the one pulley, switches an oil passage communicated to the first hydraulic actuator when seventh signal pressure is applied thereto, and applies the hydraulic pressure to or lowers the hydraulic pressure of the first hydraulic actuator.

The hydraulic control device of the belt-type continuously variable transmission according to the first aspect of the present invention further includes: a fourth clutch that is configured to be engaged even when the power transmission between the power source and the drive wheel is blocked; and a fourth control valve that outputs eighth signal pressure for engaging the fourth clutch. The second switching valve may apply the hydraulic pressure to or lower the hydraulic pressure of the first hydraulic actuator when the eighth signal pressure is increased.

The hydraulic control device of the belt-type continuously variable transmission according to the first aspect of the present invention further includes: a second pressure regulator valve that outputs ninth signal pressure for applying the hydraulic pressure to and lowering the hydraulic pressure of the first hydraulic actuator. The second switching valve may apply the hydraulic pressure to or lower the hydraulic pressure of the first hydraulic actuator in accordance with the eighth signal pressure and the ninth signal pressure.

In the hydraulic control device of the belt-type continuously variable transmission according to the first aspect of the present invention, the fourth clutch may include a fifth clutch that is engaged during the start of the vehicle and allows the power transmission between the power source and the drive wheel without interposing the belt therebetween.

The hydraulic control device of the belt-type continuously variable transmission according to the first aspect of the present invention further includes: a sixth clutch that is engaged and allows the power between the power source and the drive wheel; and a fifth control valve that outputs tenth signal pressure for engaging the sixth clutch. The second switching valve may apply the hydraulic pressure to or lower the hydraulic pressure of the hydraulic actuator by lowering the tenth signal pressure.

The hydraulic control device of the belt-type continuously variable transmission according to the first aspect of the present invention further includes: a third hydraulic actuator that is provided in the other pulley of the paired pulleys and reduces the width of the belt groove when the hydraulic pressure is applied thereto; and a sixth control valve that outputs eleventh signal pressure for controlling the hydraulic pressure of the third hydraulic actuator. The second switching valve may apply the hydraulic pressure to or lower the hydraulic pressure of the first hydraulic actuator in accordance with the tenth signal pressure and the eleventh signal pressure.

The hydraulic control device of the belt-type continuously variable transmission according to the first aspect of the present invention further includes: a third pressure regulator valve that outputs twelfth signal pressure for applying the hydraulic pressure to or lowering the hydraulic pressure of the first hydraulic actuator. The second switching valve may apply the hydraulic pressure to or lower the hydraulic pressure of the first hydraulic actuator in accordance with the tenth signal pressure, the eleventh signal pressure, and the twelfth signal pressure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 3:
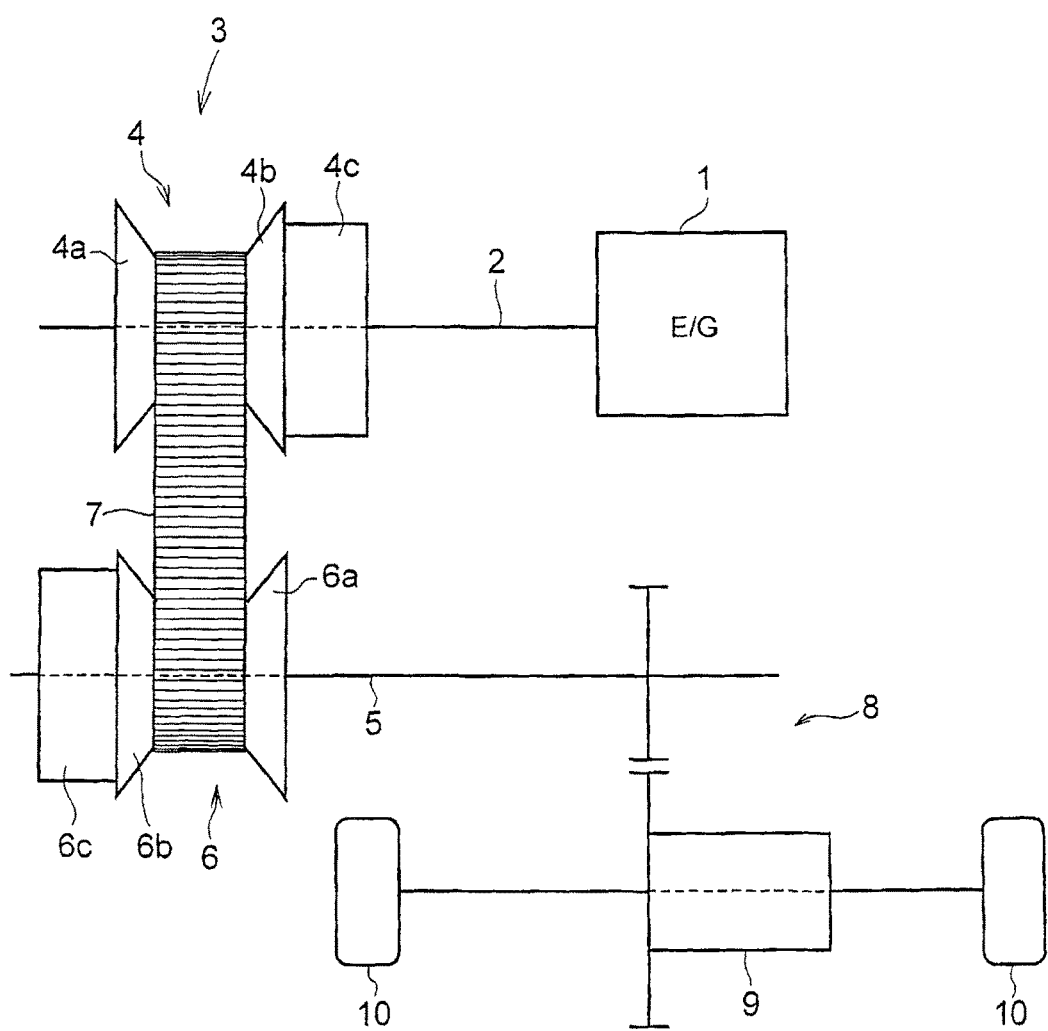
FIG. 3 is a schematic view for illustrating a configuration of a power transmission apparatus that includes a belt-type continuously variable transmission as a subject of the present invention.

A belt-type continuously variable transmission as a subject of the present invention includes a primary pulley and a secondary pulley, each having a belt groove around which a belt is wound. FIG. 3 schematically shows an example of a configuration of a power transmission apparatus that includes the belt-type continuously variable transmission. The power transmission apparatus shown in FIG. 3 includes an engine 1 that functions as a power source. The engine 1 combusts a supplied fuel to output power. The engine 1 is a gasoline engine, a diesel engine, a liquid petroleum gas (LPG) engine, or the like. Although FIG. 3 exemplifies the power transmission apparatus with the engine 1 as the power source, an electric motor may be used as the power source. Alternatively, both of the engine 1 and the electric motor may be used as the power sources.

A belt-type continuously variable transmission (hereinafter abbreviated as the CVT) 3 is connected to an output shaft 2 of the engine 1. The output shaft 2 functions as an input shaft of the CVT 3. In the following description, the output shaft 2 may also be referred to as the input shaft 2. In addition, a torque converter or a forward or reverse switching mechanism may be included between the output shaft 2 and the CVT 3. The CVT 3 shown in FIG. 3 is formed of a primary pulley 4, a secondary pulley 6, and a belt 7. The primary pulley 4 is connected to the input shaft 2. The secondary pulley 6 is connected to an output shaft 5. The belt 7 is wound around the belt groove that is formed in each of the pulleys 4, 6 to transmit torque. In the CVT 3, the torque is transmitted by friction contact between each of the pulleys 4, 6 and the belt 7, and a gear is changed by changing a groove width of each of the pulleys 4, 6. More specifically, the primary pulley 4 is formed of a conical fixed sheave 4a and a conical movable sheave 4b. The conical fixed sheave 4a is integrated with the input shaft 2. The conical movable sheave 4b is disposed such that it can integrally rotate with the input shaft 2 and move in an axial direction of the input shaft 2. A hydraulic actuator 4c that presses the movable sheave 4b to the fixed sheave 4a side in accordance with the applied (supplied) hydraulic pressure is attached to the movable sheave 4b. Meanwhile, the secondary pulley 6 is formed of a conical fixed sheave 6a and a conical movable sheave 6b. The conical fixed sheave 6a is integrated with the output shaft 5. The conical movable sheave 6b is disposed such that it can integrally rotate with the output shaft 5 and move in an axial direction of the output shaft 5. A hydraulic actuator 6c that generates a thrust for pressing the movable sheave 6b to the fixed sheave 6a side is attached to the movable sheave 6b. The hydraulic actuator 6c can be regarded as a second hydraulic actuator and a third hydraulic actuator in the present invention.

In the power transmission apparatus shown in FIG. 3, a clamping force to clamp the belt 7 is changed in accordance with the hydraulic pressure that is applied (supplied) to the hydraulic actuator 6c, and a transmission torque capacity is thereby controlled. The transmission torque capacity can be determined in accordance with, an estimated magnitude of the torque to be input to the CVT 3. The torque to be input to the CVT 3 is estimated in accordance with a traveling status, an operation amount of an accelerator pedal, a road condition detected by a navigation system, or the like. When the estimated torque is input to the CVT 3, the transmission torque capacity is set so as to prevent slippage of the belt 7 on each of the pulleys 4, 6.

In addition, in the power transmission apparatus shown in FIG. 3, a gear change ratio is changed in accordance with a difference in magnitudes of the hydraulic pressure that are applied (supplied) to the hydraulic actuators 4c, 6c or magnitudes of pressure to press the belt 7 on the basis of the applied (supplied) hydraulic pressure. In other words, the movable sheave 4b Moves to the fixed sheave 4a side by increasing pressure of the primary pulley 4 to press the belt 7 or by lowering pressure of the secondary pulley 6 to press the belt 7. Then, a winding radius of the belt 7 on the primary pulley 4 is increased, and the gear change ratio is thereby reduced. On the contrary, the movable sheave 4b moves in a direction to separate from the fixed sheave 4a side by lowering the pressure of the primary pulley 4 to press the belt 7 or by increasing the pressure of the secondary pulley 6 to press the belt 7. Then, the winding radius of the belt 7 on the primary pulley 4 is reduced, and the gear change ratio is thereby increased. In other words, in the power transmission apparatus shown in FIG. 3, the hydraulic pressure of the hydraulic actuator 4c is increased or the hydraulic pressure of the hydraulic actuator 6c is lowered during upshifting. In addition, in the power transmission apparatus shown in FIG. 3, the hydraulic pressure of the hydraulic actuator 4c is lowered or the hydraulic pressure of the hydraulic actuator 6c is increased during downshifting. In the power transmission apparatus shown in FIG. 3, a target gear change ratio is determined in accordance with the operation amount of the unillustrated accelerator pedal and the vehicle speed or in accordance with a shift lever position, and a determination for upshifting or downshifting can be made. That is, a determination can be made on whether or not to change the width of the belt groove. Then, the torque that is output from the secondary pulley 6 is transmitted to drive wheels 10, 10 through the output shaft 5, a gear train 8, and a differential gear 9. The hydraulic actuator 4c can be regarded as a first hydraulic actuator in the present invention.

Figure 4:
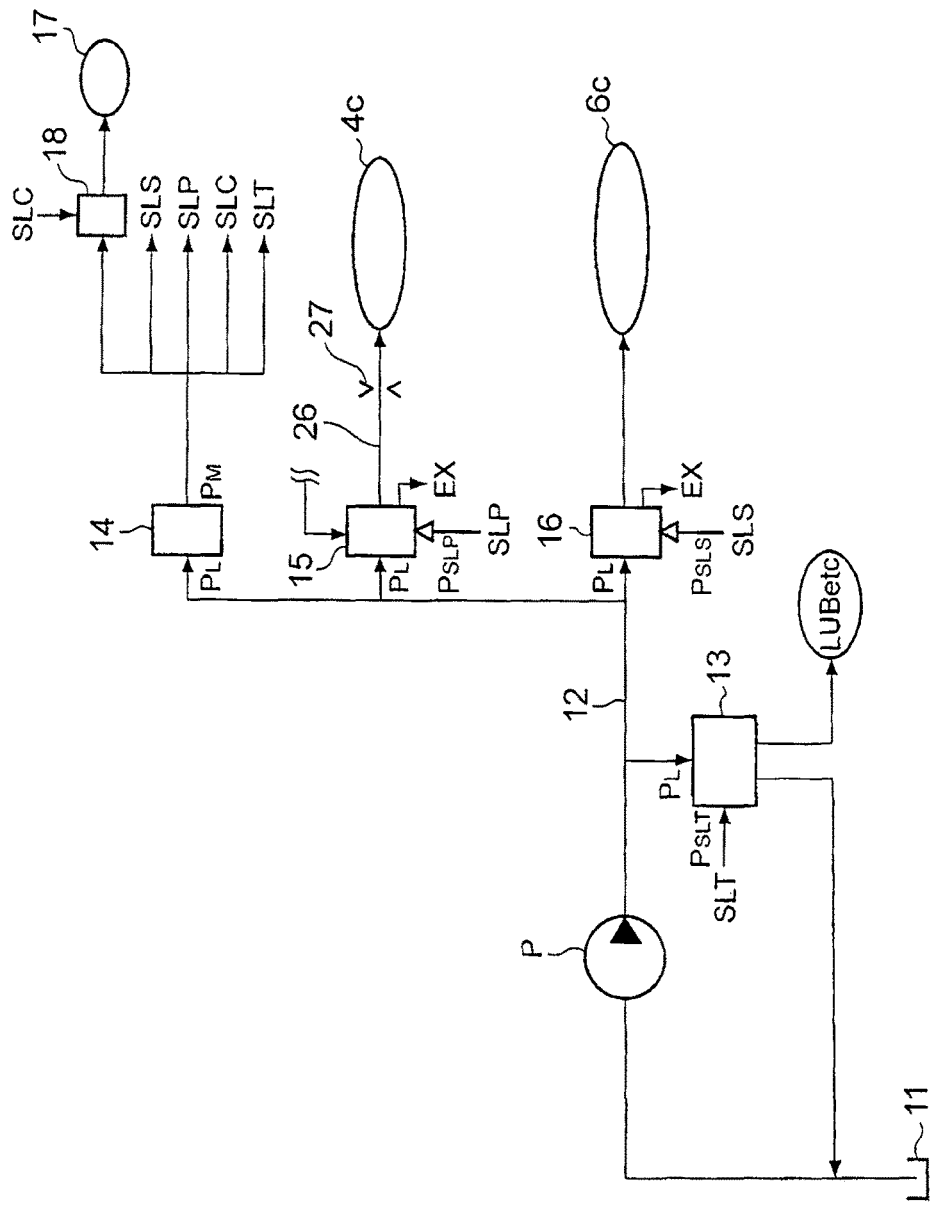
FIG. 4 is a hydraulic circuit diagram for illustrating an example of the configuration of the hydraulic control device that controls the power transmission apparatus shown in FIG. 3.

FIG. 4 shows an example of a configuration of a hydraulic control device that can control the hydraulic pressure of each of the hydraulic actuators 4c, 6c shown in FIG. 3. The hydraulic control device shown in FIG. 4 is provided with an oil pump P, such as a mechanical oil pump or an electric oil pump, that functions as a hydraulic pressure source. The mechanical oil pump is driven by the torque that is transmitted from the power transmission apparatus. The electric oil pump is driven by the unillustrated electric motor. Then, the oil pump P pumps up oil stored in an oil pan 11 and supplies the oil to each of the hydraulic actuators 4c, 6c. In the example shown in FIG. 4, a primary regulator valve 13 that regulates hydraulic pressure in an oil passage 12 is provided. The oil output from the oil pump P flows through the oil passage 12. The primary regulator valve 13 controls the hydraulic pressure in the oil passage 12 in accordance with signal pressure $P_{SLT}$ that is output from a solenoid valve SLT, which will be described below. The primary regulator valve 13 is opened to discharge the oil in the oil passage 12 when the hydraulic pressure in the oil passage 12 is higher than the hydraulic pressure that corresponds to the signal pressure. $P_{SLT}$. The oil that is discharged from the oil passage 12 by opening of the primary regulator valve 13 is either returned to the oil pan 11 or supplied to a lubricated section (LUB) such as a meshing part or a friction contact part of a gear. In the following description, the hydraulic pressure that is regulated by the primary regulator valve 13 may be referred to as line pressure $P_L$.

In the example shown in FIG. 4, the line pressure $P_L$ is applied (supplied) to a modulator valve 14, a first control valve 15, and a second control valve 16. The modulator valve 14 further modulates the line pressure $P_L$ to be constant pressure. The first control valve 15 controls the hydraulic pressure of the hydraulic actuator 4c. The second control valve 16 controls the hydraulic pressure of the hydraulic actuator 6c. The above first control valve 15 can be regarded as a hydraulic pressure control valve, a first pressure regulator valve, a second pressure regulator valve, and a third pressure regulator valve in the present invention. Then, oil output from the modulator valve 14 is applied (supplied) to each of solenoid valves SLS, SLP, SLC, SLT that output signal pressure to the first control valve 15, the second control valve 16, and the primary regulator valve 13 and applied (supplied) to a control valve 18 that controls hydraulic pressure of a clutch 17.

The second control valve 16 is a pressure control valve that communicates between the oil passage 12 and the hydraulic actuator 6c and discharges oil in the hydraulic actuator 6c to the oil pan 11 in accordance with signal pressure, $P_{SLS}$ that is output from the above solenoid valve SLS. In other words, the second control valve 16 outputs the hydraulic pressure that is regulated on the basis of the line pressure $P_L$ as the source pressure and thereby controls the hydraulic pressure of the hydraulic actuator 6c. The solenoid valve SLS that applies (supplies) the signal pressure $P_{SLS}$ to the hydraulic actuator 6c is energized by electric current in accordance with the transmission torque capacity. The solenoid valve SLS can be regarded as a third control valve and a sixth control valve in the present invention. The signal pressure $P_{SLS}$ can be regarded as sixth signal pressure and eleventh signal pressure.

Figure 1:
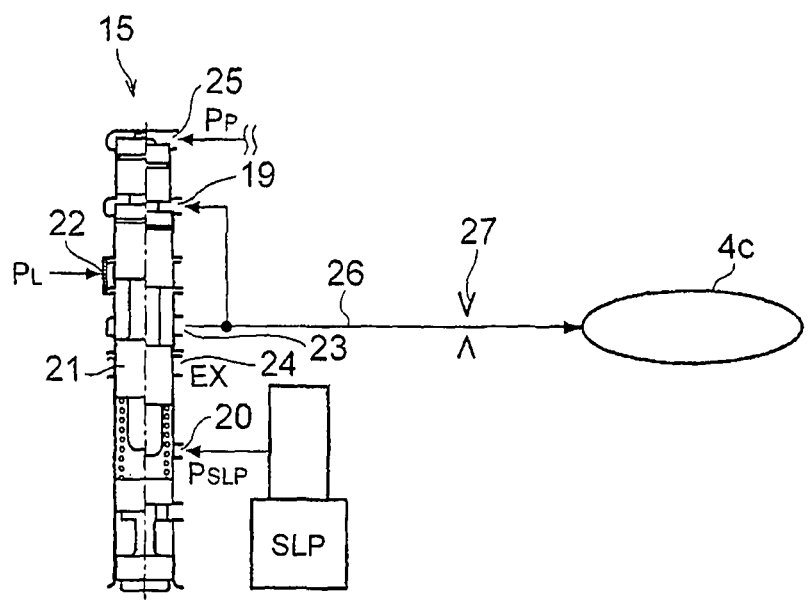
FIG. 1 is a schematic view for illustrating an example of a configuration of, a hydraulic control device according to the present invention.

The first control valve 15 is a spool-type pressure control valve that communicates between the oil passage 12 and the hydraulic actuator 4c and discharges oil in the hydraulic actuator 4c to the oil pan 11 in accordance with signal pressure $P_{SLP}$ that is output from the above solenoid valve SLP. FIG. 1 shows an example of a configuration of the first control valve 15. The first control valve 15 shown in FIG. 1 regulates the line pressure $P_L$ as the source pressure to be gear-change hydraulic pressure that either sets or changes a gear change ratio, and outputs the gear-change hydraulic pressure. The first control valve 15 also controls the hydraulic pressure of the hydraulic actuator 4c. More specifically, the first control valve 15 is formed with: a feedback port 19 to which the hydraulic pressure of the hydraulic actuator 4c (feedback pressure) is applied (supplied); and a pilot port 20 to which the signal pressure $P_{SLP}$ is applied (supplied). Loads that are based on the hydraulic pressure applied (supplied) to, the ports 19, 20 are opposed to each other and exert on a spool 21. Electric current that energizes the solenoid valve SLP is controlled in accordance with the electric current that energizes the above solenoid valve SLS and the target gear change ratio. In other words, the electric current that energizes the solenoid valve SLP is controlled such that the gear change ratio becomes the target gear change ratio. The gear change ratio corresponds to the difference between the pressure of the primary pulley 4 to press the belt 7 and the pressure of the secondary pulley 6 to press the belt 7 that is based on the electric current for energizing the above solenoid valve SLS.

When the signal pressure $P_{SLP}$ that is applied (supplied) from the solenoid valve SLP to the first control valve 15 is increased, the loads acting on the spool 21 become unbalanced, and the oil passage 12 is communicated with the hydraulic actuator 4c. In other words, the spool 21 is moved so as to communicate between an input port 22 and an output port 23, thereby increasing the pressure of the hydraulic actuator 4c. On the contrary, when the signal pressure $P_{SLP}$ that is applied (supplied) from the solenoid valve SLP to the first control valve 15 is lowered, the loads acting on the spool 21 becomes unbalanced, and the hydraulic actuator 4c is communicated with the oil pan 11. In other words, the spool 21 is moved so as to communicate between the output port 23 and a drain port 24, thereby lowering the hydraulic pressure of the hydraulic actuator 4c. The signal pressure $P_{SLP}$ can be regarded as first signal pressure and twelfth signal pressure in the present invention.

In addition, the first control valve 15 shown in FIG. 1 is formed with a pilot port 25 such that signal pressure $P_P$ that can be regarded as second signal pressure in the present invention is exerted in a same direction as a direction in which the feedback pressure is exerted on the spool 21. The signal pressure $P_P$ serves to rapidly lower the hydraulic pressure of the hydraulic actuator 4c. The signal pressure $P_P$ is applied (supplied) to the first control valve 15 when a request to increase the gear change speed for downshifting is made. In other words, the signal pressure $P_P$ is applied (supplied) to the first control valve 15 during rapid deceleration or during temporary stop of a vehicle. When the signal pressure $P_P$ is applied (supplied) to the first control valve 15 as described above, a magnitude of movement of the spool 21 to communicate between the output port 23 and the drain port 24 is further increased. Then, a degree of opening of the drain port 24 that is communicated with the oil pan 11 is also increased. In other words, the first control valve 15 lowers the hydraulic pressure of the hydraulic actuator 4c using the line pressure PL as the source pressure. This can be achieved without relying on a pressure regulating action for regulating the pressure to be the gear-change hydraulic pressure that either sets or changes the gear change ratio in accordance with the signal pressure $P_{SLP}$ and the feedback pressure. That is, gear change equipment regulates the source pressure to be the gear-change hydraulic pressure and also regulates the hydraulic pressure of the first hydraulic actuator.

An orifice 27 is provided in an oil passage 26 that communicates with the first control valve 15 and the hydraulic actuator 4c. The orifice 27 is used to suppress or prevents the slippage of the belt 7 and each of the pulleys 4, 6 in a circumferential direction even when the signal pressure $P_P$ is applied (supplied) to the first control valve 15 and the hydraulic pressure of the hydraulic actuator 4c is rapidly lowered. That is, an opening diameter of the orifice 27 is determined such that a change rate to lower the hydraulic pressure of the hydraulic actuator 4c becomes lower than a change rate at which the slippage of the belt 7 and each of the pulleys 4, 6 in the circumferential direction can be suppressed or prevented. In other words, an upper limit of the change rate to lower the hydraulic pressure of the hydraulic actuator 4c is determined by the orifice 27. When the feedback pressure does not exerted on the first control valve 15, the spool 21 is in a state that is shown in the left side in FIG. 1 of the drawing. When the feedback pressure is exerted on the first control valve 15 but the signal pressure $P_P$ is not exerted thereon, the spool 21 is in a state that is shown in the right side in FIG. 1 of the drawing. Accordingly, when the signal pressure $P_P$ is exerted on the first control valve 15, the spool 21 further moves to the lower side than the position of the spool 21 shown in the right side in FIG. 1 of the drawing.

When the signal pressure $P_P$ is exerted on the first control valve 15 as described above, the first control valve 15 does not perform the pressure regulating action. Accordingly, a degree of opening of the drain port 24 is increased, and it is possible to increase an amount of the oil that is discharged from the hydraulic actuator 4c during the rapid deceleration or during temporary stop of the vehicle. This results in an increase of the gear change speed during downshifting. Thus, after the rapid deceleration or after temporary stop of the vehicle, the gear change ratio can be changed to one that is set for restart in an early stage. Therefore, it is possible to suppress or prevent shortage of the torque or degradation in acceleration response during restart. Here, as described above, equipment that exerts the signal pressure $P_P$ on the first control valve 15 and discharges the oil from the hydraulic, actuator 4c without relying on the pressure regulating action of the first control valve 15 can be regarded as the gear change equipment and signal pressure applying (supplying) equipment in the present invention.

Figure 2:
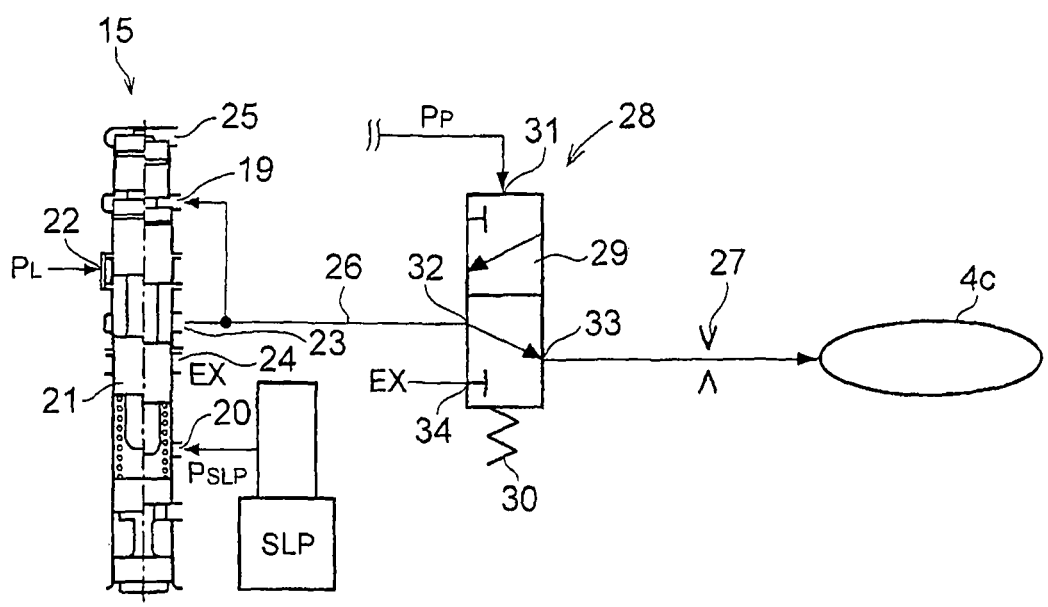
FIG. 2 is a schematic view for illustrating another example of the configuration of the hydraulic control device according to the present invention.

Next, a description will be made on another configuration of the hydraulic control device in the present invention. FIG. 2 is a schematic view for illustrating another configuration. In an example shown in FIG. 2, the oil is discharged from a position between the first control valve 15 and the hydraulic actuator 4c in the example shown in FIG. 1. The same components as those in FIG. 1 are denoted by the same reference numerals, and the description thereof is not repeated. In the first control valve 15 shown in FIG. 2, it is determined by the feedback pressure and the signal pressure $P_{SLP}$ whether to communicate between the input port 22 and the output port 23 or to communicate between the output port 23 and the drain port 24. In other words, the other configuration of the first control valve 15 is same as that in FIG. 1 except that the signal pressure $P_P$ is not applied (supplied) to the pilot port 25 in the first control valve 15 shown in FIG. 1. A switching valve 28 is provided between the first control valve 15 and the orifice 27 provided in the oil passage 26. The switching valve 28 switches the communication between the first control valve 15 and the hydraulic actuator 4c or the communication between the hydraulic actuator 4c and the oil pan 11 in accordance with the signal pressure $P_P$. More specifically, a spring 30 is provided at one end of a spool 29. Then, a pilot port 31 is formed such that a load based on the signal pressure $P_P$ exerts on the spool 29 in an opposite direction from a spring force of the spring 30. In other words, when the signal pressure $P_P$ is increased and the load that is based on the signal pressure $P_P$ and acts on the spool 29 becomes larger than the spring force, the spool 29 moves to the lower side in FIG. 2. On the contrary, when the signal pressure $P_P$ is lowered and the load that is based on the signal pressure $P_P$ and exerts on the spool 29 becomes smaller than the spring force, the spool 29 moves to the upper side in FIG. 2. The switching valve 28 can be regarded as a second switching valve in the present invention. The oil passage 26 can be regarded as a first oil passage in the present invention. The signal pressure $P_P$ shown in this example can be regarded as seventh signal pressure in the present invention.

When the spool 29 moves to the upper side in FIG. 2, the first control valve 15 and the hydraulic actuator 4c are communicated with each other. When the spool 29 moves to the lower side in FIG. 2, the hydraulic actuator 4c and the oil pan 11 are communicated with each other, and the communication between the first control valve 15 and the hydraulic actuator 4c is blocked. In other words, when the spool 29 moves to the upper side in FIG. 2, an input port 32 and an output port 33, of the switching valve 28 are communicated with each other. When the spool 29 moves to the lower side in FIG. 2, the output port 33 and a drain port 34 of the switching valve 28 are communicated with each other, and the communication between the input port 32 and an output port 33 is blocked. Then, an amount of the oil that is discharged when the output port 33 and the drain port 34 of the switching valve 28 are communicated becomes larger than an amount of the oil that is discharged only by the first control valve 15 during a gear change.

Accordingly, when the signal pressure $P_P$ is applied (supplied) to the switching valve 28 during the rapid deceleration or during temporary stop of the vehicle, it is possible to increase the amount of the oil that is discharged from the hydraulic actuator 4c. In other words, when the switching valve 28 is switched, the hydraulic pressure of the hydraulic actuator 4c can be lowered rapidly without relying on the pressure regulating action of the first control valve 15. That is, the gear change equipment regulates the source pressure to be the gear-change hydraulic pressure, and thus can regulate the hydraulic pressure of the first hydraulic actuator. This increases the gear change speed during downshifting.

Thus, after the rapid deceleration or after temporary stop of the vehicle, the gear change ratio can be changed to one that is set for restart in the early stage. Therefore, it is possible to suppress or prevent shortage of the torque or degradation in the acceleration response during restart. As described above, equipment that exerts the signal pressure $P_P$ on the switching valve 28 and that discharges the oil from the hydraulic actuator 4c can be regarded as the gear change equipment in the present invention.

For each of the hydraulic control devices described above, the description has been made on the example that the hydraulic pressure of the hydraulic actuator 4c is lowered for downshifting; however, the hydraulic pressure of the hydraulic actuator 6c may be increased for downshifting. In such a case, like the first control valve 15, the second control valve 16 that controls the hydraulic pressure of the hydraulic actuator 6c may be regulated by the signal pressure $P_{SLS}$ and the feedback pressure such that the signal pressure $P_P$ is exerted in an opposite direction from the feedback pressure, or a switching valve that is similar to the above switching valve 28 may be provided between the second control valve 16 and the hydraulic actuator 6c such that high hydraulic pressure such as the line pressure $P_L$ is applied (supplied) to a drain port in the switching valve. In addition to downshifting, the hydraulic pressure of the hydraulic actuator 4c can be increased for upshifting. In such a case, the first control valve 15 may be adapted such that the signal pressure $P_P$ is exerted in the opposite direction from the feedback pressure or that high hydraulic pressure such as the line pressure $P_L$ is applied (supplied) to the drain port 34 in the switching valve 28. In the following description, an example in which the hydraulic pressure of the hydraulic actuator 4c is rapidly lowered for downshifting will be described.

Figure 5:
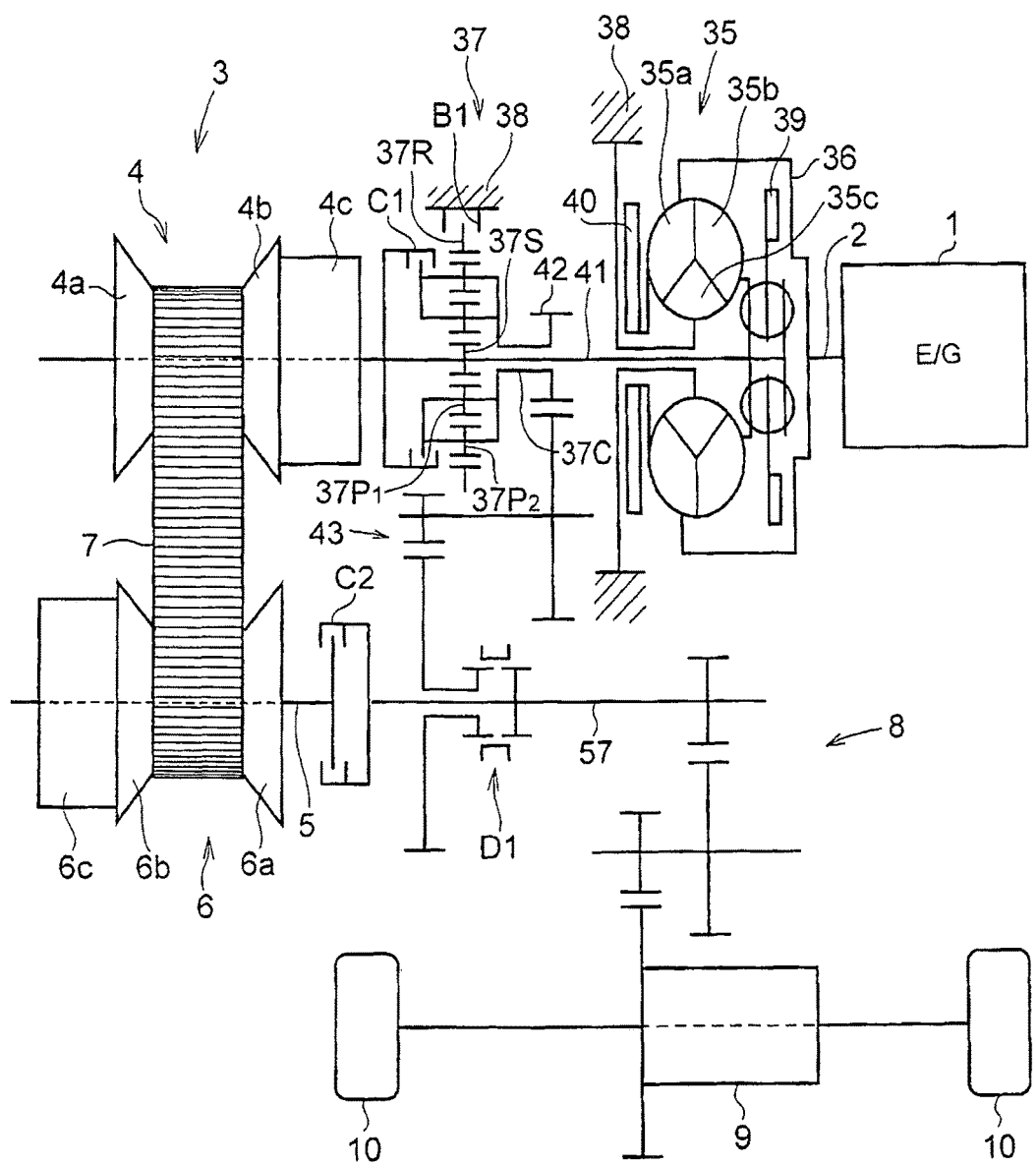
FIG. 5 is a schematic view for illustrating another configuration, of the power transmission apparatus that includes the belt-type continuously variable transmission as the subject of the present invention.

Next, a description will be made on another configuration of the power transmission apparatus that includes the belt-type continuously variable transmission as the subject of the present invention. FIG. 5 is a schematic view for illustrating the configuration of the power transmission apparatus. The same components as those in FIG. 3 are denoted by the same reference numerals as in FIG. 3, and the description thereof is not repeated. In the power transmission apparatus shown in FIG. 5, the torque converter 35 is connected to the output shaft 2 of the engine 1. The torque converter 35 has the same configuration as a torque converter that has conventionally been known. The torque converter 35 includes: a pump impeller 35a that is connected to the engine 1 through the output shaft 2 and a front cover 36; a turbine runner 35b that is disposed to face the pump impeller 35a and is connected to a forward or reverse switching mechanism 37, which will be described below; and a stator 35c that is disposed between the pump impeller 35a and the turbine runner 35b and is connected to a case 38 through an unillustrated one-way clutch. A hydraulic fluid is enclosed in a space that is surrounded by the pump impeller 35a and the turbine runner 35b. In the torque converter 35, the pump impeller 35a is rotated by the torque that is transmitted from the engine 1. Then, the enclosed hydraulic fluid flows by rotation of the pump impeller 35a and rotates the turbine runner 35b. In other words, the torque converter 35 functions as a fluid coupling that transmits the torque. In addition, the stator 35c is provided to restrict a flowing direction of the hydraulic fluid. When a rotational speed of the turbine runner 35b becomes a higher rotational speed than a rotational speed of the pump impeller 35a, the stator 35c is fixed to the case 38 through the one-way clutch so as to prevent rotation thereof. With such a configuration of the torque converter 35, the torque that is output from the engine 1 can be amplified and output to the forward or reverse switching mechanism 37 in a so-called converter area.

On the other hand, a lock-up clutch 39 is provided to transmit power without using the torque converter 35 in a case where the rotational speed of the pump impeller 35a corresponds to the rotational speed of the turbine runner 35b, or the like. The lock-up clutch 39 is arranged in parallel to the above torque converter 35 and is configured to rotate the pump impeller 35a and the turbine runner 35b in an integral manner. The lock-up clutch 39 is a friction engaging member formed in a disc shape and is driven by a difference in hydraulic pressure on a front face and a back face. In the example, shown in FIG. 5, the hydraulic pressure of the lock-up clutch 39 on the engine 1 side (right side of FIG. 5 in the drawing) is lowered to make it lower than the hydraulic pressure on the torque converter 35 side (left side of FIG. 5 in the drawing), and the lock-up clutch 39 thereby moves to the engine 1 side. Then, when the lock-up clutch 39 is frictionally engaged with the front cover 36, the pump impeller 35a and the turbine runner 35b are integrated with each other. On the contrary, when the hydraulic pressure, of the lock-up clutch 39 on the engine 1 side is increased to make it higher than the hydraulic pressure on the torque converter 35 side, the lock-up clutch 39 separates from the front cover 36.

In addition, in the example shown in FIG. 5, a mechanical oil pump 40 that can be driven by the torque output from the engine 1 to discharge oil is connected to the pump impeller 35a. Accordingly, the oil can be discharged when the torque that is output from the engine 1 is transmitted to the mechanical oil pump 40 through the output shaft 2, the front cover 36, and the pump impeller 35a. The mechanical oil pump 40 is driven even when the torque for running the vehicle is not output from the engine 1 and the torque is transmitted from the drive wheels 10, 10, such as a case where an engine brake is applied to the drive wheels 10, 10. In other words, the mechanical oil pump 40 is driven by a traveling inertia force of the vehicle.

An output shaft 41 that is integrated with the turbine runner 35b is connected to the forward or reverse switching mechanism 37 that changes a direction of the transmitted torque to exert on the drive wheels 10, 10 when the torque is transmitted to the drive wheels 10, 10 without using the CVT 3. The forward or reverse switching mechanism 37 shown in FIG. 5 is formed of a planetary gear mechanism of a double pinion type. If a brief description will be made here on a configuration of the forward or reverse switching mechanism 37, the planetary gear mechanism of the double pinion type includes: a sun gear 37S that is integrated with the output shaft 41; a ring gear 37R that is coaxially arranged on a rotation axis of the sun gear 37S; a first pinion gear 37R that meshes with the sun gear 37S; a second pinion gear $37P_2$ that meshes with the first pinion gear $37P_1$ and the ring gear 37R; and a carrier 37C that holds the first pinion gear $37P_1$ and the second pinion gear $37P_2$ in a manner to allow rotation and revolution thereof and is connected to a gear train 43 through an output gear 42. In addition, the output shaft 41 is provided with a clutch C1 that rotates the sun gear 37S and the carrier 37C in an integrated manner when being engaged. A brake B1 for fixing the ring gear 37R is also provided.

In the forward or reverse switching mechanism 37, the sun gear 37S functions as an input element, the ring gear 37R functions as a reaction element, and the carrier 37C functions as an output element. Accordingly, the sun gear 37S and the carrier 37C are integrated with each other when the clutch C1 is engaged and the brake B1 is disengaged; therefore, the output shaft 41 and the output gear 42 integrally rotate with each other. On the contrary, when the clutch C1 is disengaged and the brake B1 is engaged, the sun gear 37S and the carrier 37C rotate in a reverse direction. This reverses a rotational direction of the output shaft 41 and a rotational direction of the output gear 42. The clutch C1 and the brake B1 are frictional engaging devices whose engaging force is controlled by the hydraulic pressure that is applied (supplied) thereto. Accordingly, it is possible to determine whether to engage the clutch C1 or the brake B1 in accordance with an operation of an unillustrated shift lever. The clutch C1 and the brake B1 can be regarded as a first clutch, a second clutch, a fourth clutch, and a fifth clutch in the present invention. In addition, a gear ratio is set such that a gear change ratio at which the torque is transmitted to the drive wheels 10, 10 through the forward or reverse switching mechanism 37 and the gear train 43 becomes larger than a maximum gear change ratio at which the torque is transmitted to the drive wheels 10, 10 through the CVT 3. Mainly, during the start of the vehicle, the torque is transmitted to the drive wheels 10, 10 through the forward or reverse switching mechanism 37 and the gear train 43.

A clutch C2 is connected to the output shaft 5 of the CVT 3. The torque is transmitted to an output shaft 57 through the clutch C2. In other words, the clutch C2 is engaged when the torque can be transmitted to the drive wheels 10, 10 through the CVT 3. The clutch C2 is configured such that the transmission torque capacity is controlled in accordance with the applied (supplied) hydraulic pressure. The clutch C2 can be regarded as a third clutch and a sixth clutch in the present invention.

The output shaft 57 is provided with a dog clutch D1 that is engaged when the torque can be transmitted to the drive wheels 10, 10 through the forward or reverse switching mechanism 37. More specifically, the dog clutch D1 that can connect between the gear train 43 and the output shaft 57 is provided. In other words, because the dog clutch D1 is engaged during the start of the vehicle, the gear train 43 and the output shaft 57 are connected to allow power transmission therebetween. The dog clutch D1 is controlled for engagement or disengagement by an unillustrated electric actuator.

In the power transmission apparatus shown in FIG. 5, the clutch C2 and the dog clutch D1 are disengaged when the power transmission between the engine 1 and the drive wheels 10, 10 can be blocked, such as a case where the engine brake does not have to be operated during the deceleration, or during the stop of the vehicle. Meanwhile, even when the clutch C1 or the brake B1 is engaged, the power transmission between the engine 1 and the drive wheels 10, 10 can be blocked as long as the clutch C2 and the dog clutch D1 are disengaged. In addition, especially during the stop of the vehicle or during the deceleration to stop the vehicle, more specifically, when a brake pedal is depressed for deceleration at a relatively low vehicle speed, the clutch C1 and the brake B1 are engaged to transmit the power to the drive wheels 10, 10 through the gear train 43 for restart of the vehicle. Accordingly, the clutch C1 and the brake B1 are engaged during the stop of the vehicle or during the deceleration at the relatively low speed. Furthermore, when the output torque of the engine 1 is transmitted to the drive wheels 10, 10 through the CVT 3 after the stop of the vehicle or after the rapid deceleration, the gear change ratio of the CVT 3 is set to be relatively high. Thus, during the stop of the vehicle or during the rapid deceleration, downshifting is performed to increase the gear change ratio of the CVT 3.

As described above, during the stop of the vehicle or during the rapid deceleration, the hydraulic pressure of the hydraulic actuator 4c that is attached to the primary pulley 4 is rapidly lowered (discharged). In addition, even during the stop of the vehicle or the rapid deceleration, the clutch C1 can be engaged. Accordingly, in the hydraulic control device shown in FIG. 6, the hydraulic pressure of the hydraulic actuator 4c is rapidly lowered on the basis of signal pressure $P_{SLC}$ for engagement of the clutch C1. In an example shown in FIG. 6, because the signal pressure can be applied (supplied) to the first control valve 15 shown in FIG. 1 by switching a switching valve 44, which will be described below, the same components as those in FIG. 1 are denoted by the same reference numerals, and the description thereof will not be repeated. In the example shown in FIG. 6, the switching valve 44 is provided that is switched in accordance with the signal pressure $P_{SLP}$ that is applied (supplied) to the first control valve 15 and with the signal pressure $P_{SLC}$ that is applied (supplied) to the control valve 18 for controlling the hydraulic pressure of the clutch C1 when the clutch C1 is engaged. The switching valve 44 can be regarded as a first switching valve in the present invention. The switching valve 44 applies (supplies) the signal pressure to the first control valve 15 when the switching valve 44 is switched during the stop of the vehicle or during the rapid deceleration.

Figure 6:
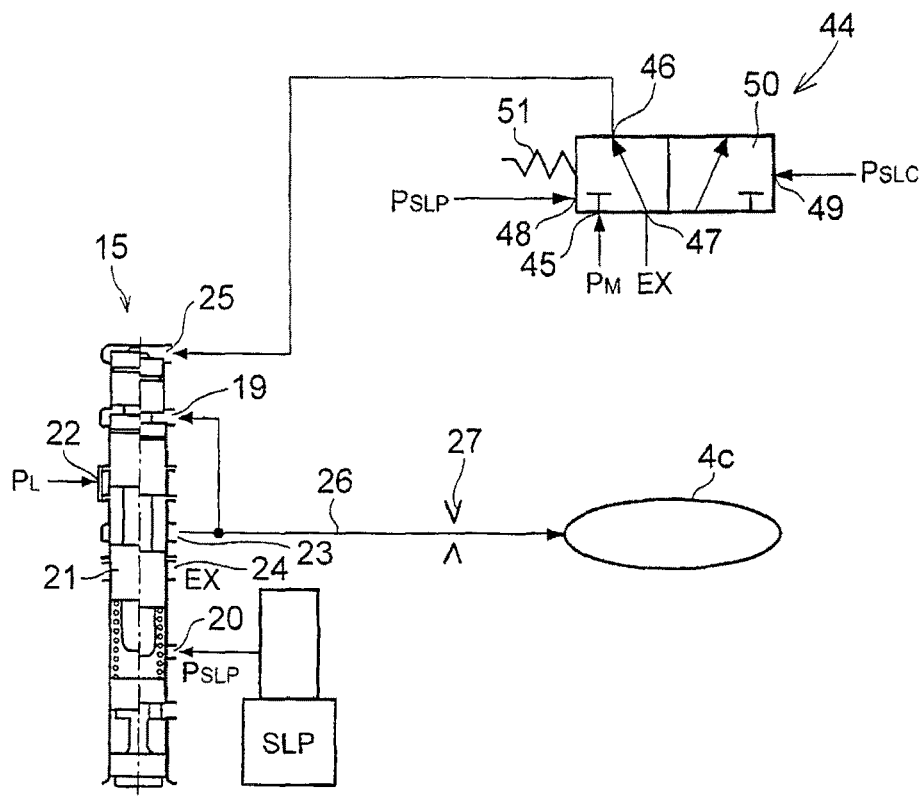
FIG. 6 is a view for illustrating an example of the configuration of the hydraulic control device that controls hydraulic pressure of a hydraulic actuator shown in FIG. 5.

More specifically, the switching valve 44 shown in FIG. 6 includes: an input port 45 to which modulator pressure $P_M$ output from the modulator valve 14 is applied (supplied); an output port 46 that is communicated with the pilot port 25 in the first control valve 15; a drain port 47 that is communicated with the oil pan 11; a first pilot port 48 that is communicated with the solenoid valve SLP; and a second pilot port 49 that is communicated with the solenoid valve SLC. In addition, the signal pressure $P_{SLC}$ for controlling the engaging pressure of the clutch C1, that is, the signal pressure $P_{SLC}$ output from the solenoid valve SLC is applied from one side of a spool 50 while a spring force of a spring 51 and the signal pressure $P_{SLP}$ output from the solenoid valve SLP are applied from the other side thereof. Then, when the signal pressure $P_{SLP}$ that is output from the solenoid valve SLP is lowered and the signal pressure $P_{SLC}$ that is output from the solenoid valve SLC is increased, the spool 50 moves to the left side in FIG. 6 of the drawing, and the modulator pressure $P_M$ is applied (supplied) to the pilot port 25 in the first control valve 15. On the contrary, when the signal pressure $P_{SLP}$ that is output from the solenoid valve SLP is increased and the signal pressure $P_{SLC}$ that is output from the solenoid valve SLC is lowered, the spool 50 moves to the right side in FIG. 6 of the drawing, and oil in the switching valve 44 is discharged to the oil pan 11. In other words, the modulator pressure $P_M$ functions as the signal pressure $P_P$ in FIG. 1 above, and thus the modulator pressure $P_M$ can be regarded as the second signal pressure in the present invention. The solenoid valve SLC can be regarded as a first control valve and a fourth control valve in the present invention. The signal pressure $P_{SLC}$ can be regarded as fourth signal pressure and eighth signal pressure in the present invention.

As described above, provision of the switching valve 44 allows the clutch C2 and the dog clutch D1 to be disengaged during the stop of the vehicle or during the rapid deceleration of the vehicle. The switching valve 44 is switched by disengaging the clutch C2 and the dog clutch D1 and by engaging the clutch C1, and the modulator pressure $P_M$ is then applied (supplied) to the first control valve 15. Accordingly, the spool 21 is moved to communicate the output port 23 with the drain port 24 in the first control valve 15 without relying on the hydraulic pressure of the hydraulic actuator 4c, and thus the oil in the hydraulic actuator 4c can be discharged. While the oil in the hydraulic actuator 4c is discharged, it is also possible to increase a discharge amount thereof. In other words, the amount of the oil that is discharged from the hydraulic actuator can be increased by lowering the hydraulic pressure of the hydraulic actuator 4c without relying on the pressure regulating action by the first control valve 15. As a result, because the gear change ratio can be changed to one that is set for restart in the early stage after the rapid deceleration or after temporary stop of the vehicle, it is possible to suppress or prevent shortage of the torque or degradation in the acceleration response during restart. In addition, because the switching valve 44 is switched in accordance with the signal pressure $P_{SLC}$, the switching valve 44 can be switched without being influenced by the set gear change ratio. Furthermore, because there is no need to engage the clutch C1 during normal travel of the vehicle in which the torque output from the engine 1 is transmitted to the drive wheels 10, 10 through the CVT 3, the signal pressure $P_{SLC}$ that is applied to the switching valve 44 is lowered. Accordingly, during the normal travel, the hydraulic pressure of the hydraulic actuator 4c can be controlled in accordance with the signal pressure $P_{SLP}$.

Figure 7:
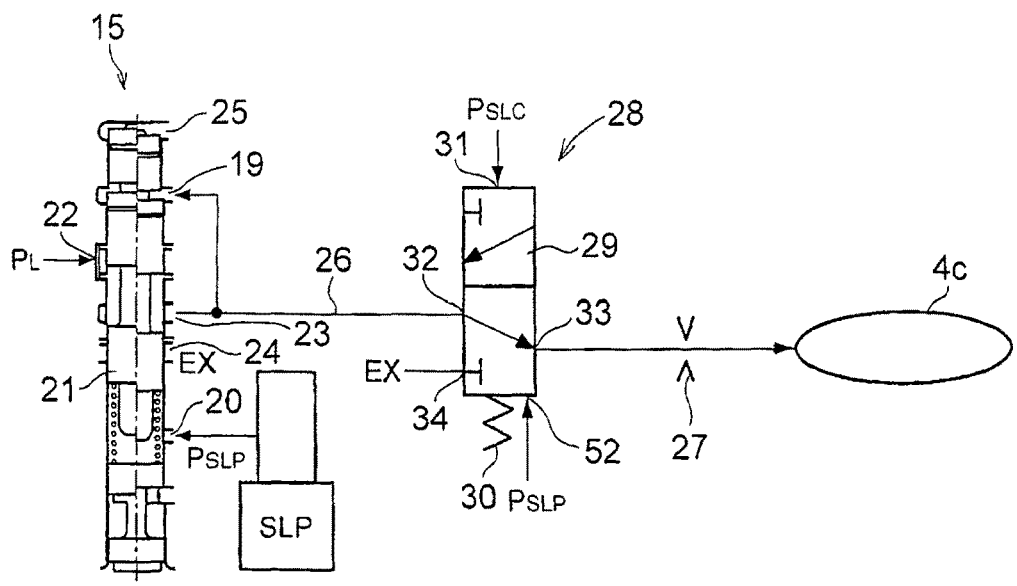
FIG. 7 is a view for illustrating another example of the configuration of the hydraulic control device that controls the hydraulic pressure of the hydraulic actuator shown in FIG. 5.

FIG. 6 shows the example in which the switching valve 44 that is switched in accordance with the signal pressure $P_{SLP}$ output from the solenoid valve SLP and the signal pressure $P_{SLC}$ output from the solenoid valve SLC is provided and in which the modulator pressure $P_M$ is applied to the spool 21 in the first control valve 15 through the switching valve 44. However, the signal pressure $P_{SLP}$ output from the solenoid valve SLP and the signal pressure $P_{SLC}$ output from the solenoid valve SLC may be applied (supplied) to the switching valve 28 shown in FIG. 2. Such a configuration is shown in FIG. 7, and, instead of the signal pressure $P_P$ in FIG. 2, the signal pressure $P_{SLC}$ that is output from the solenoid valve SLC is applied (supplied) to the pilot port 31 in an example shown in FIG. 7. The signal pressure $P_{SLC}$ that is output from the solenoid valve SLC is applied to the pilot port 31, another pilot port 52 is formed in the lower side of the switching valve 28, and the signal pressure $P_{SLP}$ of the solenoid valve SLP is applied (supplied) to the pilot port 52.

Accordingly, in the example shown in FIG. 7, the spool 29 moves to the lower side in FIG. 7 when the signal pressure $P_{SLP}$ that is output from the solenoid valve SLP is lowered and the signal pressure $P_{SLC}$ that is output from the solenoid valve SLC is increased. Then, the oil in the hydraulic actuator 4c is discharged to the oil pan 11, and the communication between the first control valve 15 and the hydraulic actuator 4c is blocked. On the contrary, when the signal pressure $P_{SLP}$ that is output from the solenoid valve SLP is increased and the signal pressure $P_{SLC}$ that is output from the solenoid valve SLC is lowered, the spool 29 moves to the upper side in FIG. 7, and the hydraulic actuator 4c is communicated with the first control valve 15.

Therefore, because the switching valve 28 is provided as shown in FIG. 7, the oil in the hydraulic actuator 4c can be discharged without relying on the hydraulic pressure of the hydraulic actuator 4c in the similar manner as in FIG. 6. While the oil in the hydraulic actuator 4c is discharged, the discharge amount thereof can be increased. In other words, it is possible to increase the amount of the oil that is discharged from the hydraulic actuator by lowering the hydraulic pressure of the hydraulic actuator 4c without relying on the pressure regulating action by the first control valve 15. As a result, because the gear change ratio can be changed to one that is set for restart in the early stage after the rapid deceleration or after the temporary stop of the vehicle, it is possible to suppress or prevent shortage of the torque or degradation in the acceleration response during restart. In addition, because the switching valve 28 is switched in accordance with the signal pressure $P_{SLC}$, the switching valve 28 can be switched without being influenced by the set gear change ratio. Furthermore, because there is no need to engage the clutch C1 during the normal travel of the vehicle in which the vehicle travels with the torque that is output from the engine 1 is transmitted to the drive wheels 10, 10 through the CVT 3, the signal pressure $P_{SLC}$ that is applied to the switching valve 28 is lowered, and the spool 29 thereby moves to the upper side in FIG. 7. This causes the communication between the hydraulic actuator 4c and the first control valve 15. Thus, the hydraulic pressure of the hydraulic actuator 4c can be controlled in accordance with the signal pressure $P_{SLP}$ during the normal travel.

Figure 8:
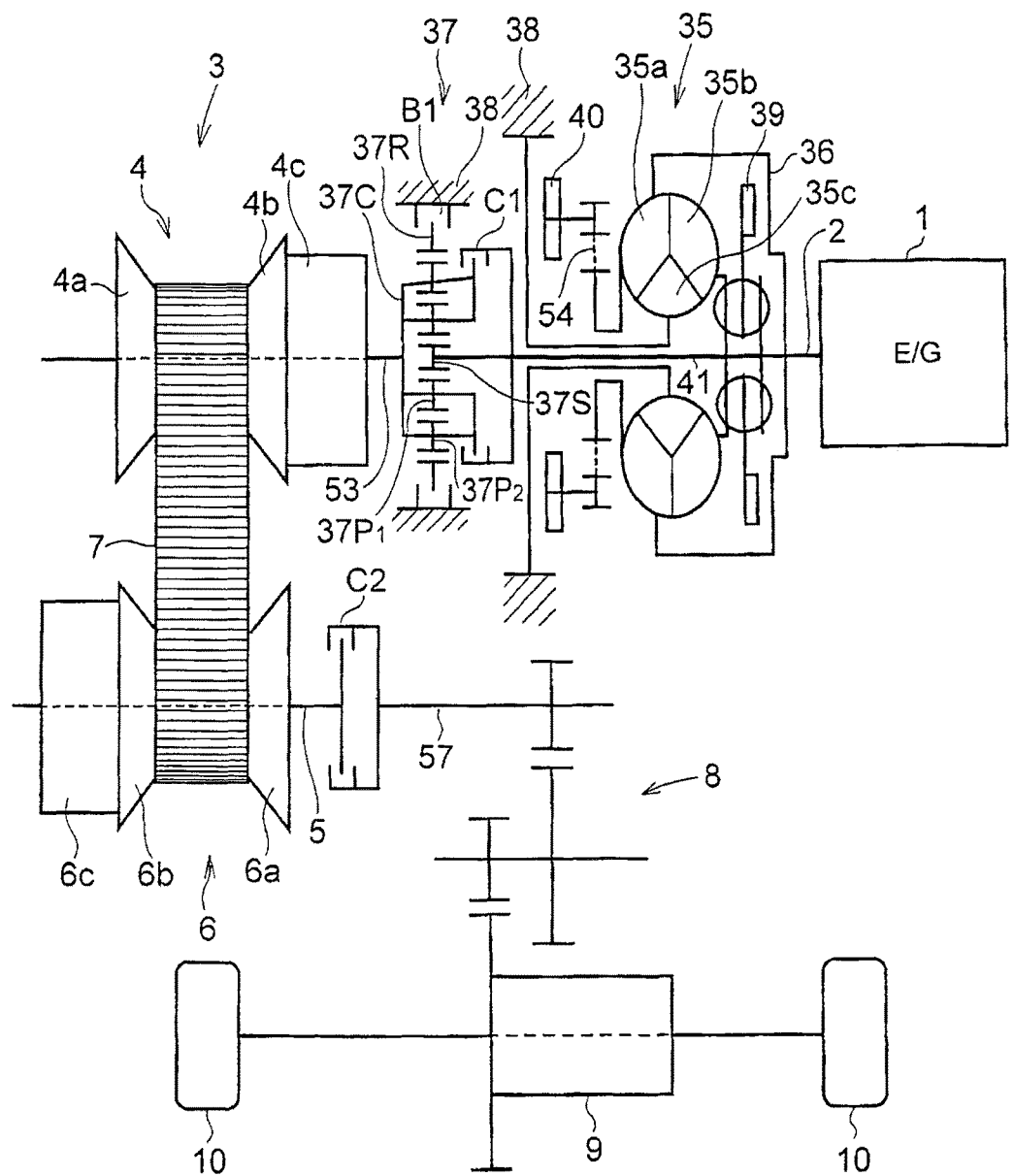
FIG. 8 is a schematic view for illustrating another configuration of the power transmission apparatus including the belt-type continuously variable transmission that can be controlled by the hydraulic control device shown in FIG. 6 and FIG. 7.

Even in the power transmission apparatus that has a configuration as shown in FIG. 8, the discharge amount of the oil that has been supplied to the hydraulic actuator 4c can be increased by the hydraulic control device shown in FIG. 6 or FIG. 7 during the stop of the vehicle or during the rapid deceleration of the vehicle. Here, a description will be made on the configuration of the power transmission apparatus shown in FIG. 8. The components in the power transmission apparatus shown in FIG. 8 that are the same as those in the power transmission apparatus shown in FIG. 5 are denoted by the same reference numerals, and the description thereof will not be repeated. In the power transmission apparatus shown in FIG. 8, the torque is transmitted to the CVT 3 through the forward or reverse switching mechanism 37. In other words, the output shaft 41 of the torque converter 35 is not integrated with an input shaft 53 of the CVT 3. That is, the sun gear 37S is connected to the output shaft 41 of the torque converter 35, and the input shaft 53 of the CVT 3 is connected to the carrier 37C. Accordingly, when the vehicle travels forward, the clutch C1 is engaged, the brake B1 is disengaged, and the output shaft 41 of the torque converter 35 and the input shaft 53 of the CVT 3 are integrally rotated. When the vehicle travels backward, the clutch C1 is disengaged, the brake B1 is engaged, and a rotational direction of the output shaft 41 of the torque converter 35 becomes opposite from a rotational direction of the input shaft 53 of the CVT 3. Then, the torque that is input to the CVT 3 is transmitted to the drive wheels 10, 10 through the clutch C2, the gear train 8, and the differential gear 9. In the example shown in FIG. 8, the power is transmitted from the pump impeller 35a to an oil pump 40 through a chain 54.

In the power transmission apparatus that is configured as shown in FIG. 8, it is possible by disengaging the clutch C2 to block the power transmission between the combination of the engine 1 and the CVT 3 and the drive wheels 10, 10. In other words, the power transmission apparatus can be brought into a neutral state by disengaging the clutch C2. In addition, even when the clutch C2 is disengaged, it is possible by engaging the clutch C1 and the brake B1 to rotate the CVT 3 without transmitting the output torque of the engine 1 to the drive wheels 10, 10. Therefore, during the stop of the vehicle or during the rapid deceleration of the vehicle, the gear change ratio of the CVT 3 can be changed by disengaging the clutch C2 and by engaging the clutch C1.

Furthermore, when the hydraulic pressure of the hydraulic actuator 4c in the power transmission apparatus shown in FIG. 8 is controlled by the hydraulic control device that is shown in FIG. 6 or FIG. 7, the oil in the hydraulic actuator 4c can be discharged without relying on the hydraulic pressure of the hydraulic actuator 4c. While the oil in the hydraulic actuator 4c is discharged, the discharge amount thereof can be increased. In other words, the amount of the oil that is discharged from the hydraulic actuator can be increased by lowering the hydraulic pressure of the hydraulic actuator 4c without relying on the pressure regulating action by the first control valve 15. Accordingly, because the gear change ratio can be changed to one that is set for restart in the early stage after the rapid deceleration or after the temporary stop of the vehicle, it is possible to suppress or prevent shortage of the torque or degradation in the acceleration response during restart. In addition, the hydraulic pressure of the hydraulic actuator 4c can be controlled in accordance with the signal pressure $P_{SLP}$ during the normal travel.

In the above examples shown in FIG. 6 and FIG. 7, the amount of the oil that is discharged from the hydraulic actuator 4c is increased or reduced in accordance with the signal pressure $P_{SLP}$ output from the solenoid valve SLP and the signal pressure $P_{SLC}$ output from the solenoid valve SLC. In addition, signal pressure $P_{SLC2}$ that is applied (supplied) to the control valve for engaging the clutch C2 may further be applied (supplied) to the switching valve 44 (28), and a load that is based on the above signal pressure $P_{SLC2}$ may exert on the spool 21 (29) in a same direction as a direction in which a load that is based on the signal pressure $P_{SLP}$ output from the above solenoid valve SLP exerts on the spool 21 (29). Furthermore, a load that is based on the above signal pressure $P_{SLS}$ output from the solenoid valve SLS may exert on the spool 21 (29) in a same direction as a direction in which the load that is based on the signal pressure $P_{SLC}$ output from the above solenoid valve SLC exerts on the spool 21 (29).

Figure 9:
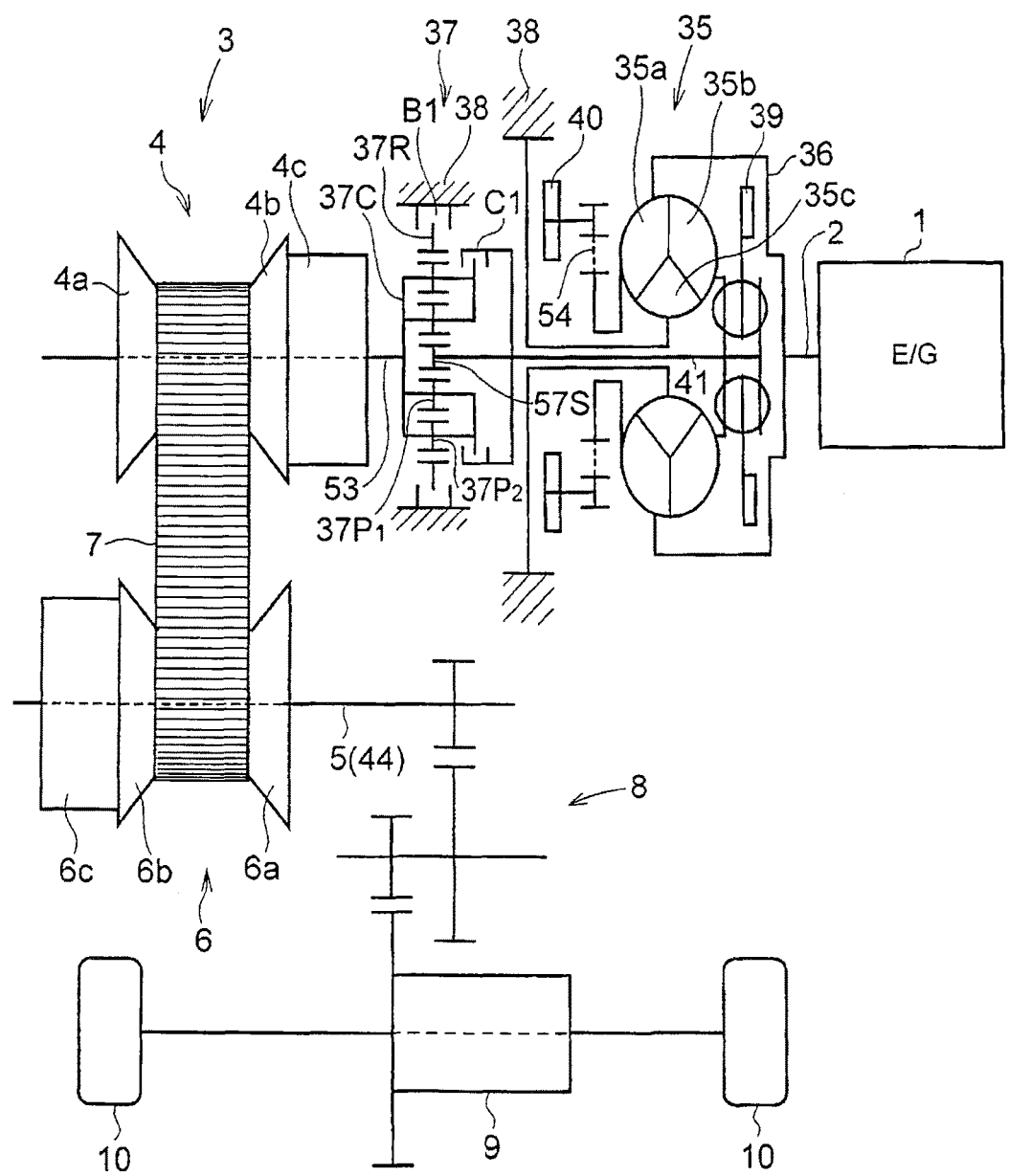
FIG. 9 is a view for illustrating the configuration of the power transmission apparatus including a clutch that is provided only between an engine and the belt-type continuously variable transmission and that can block power transmission between the engine and a drive wheel.

Next, a description will be made on an example of the configuration of the hydraulic control device that controls the CVT 3 in the power transmission apparatus as a subject as shown in FIG. 9. The power transmission apparatus only includes the clutch C1 that can block the power transmission between the engine 1 and the drive wheels 10, 10. First, the configuration of the power transmission apparatus shown in FIG. 9 is the same as that of the power transmission apparatus shown in FIG. 8 except for the clutch C2. In other words, the power transmission between the CVT 3 and the drive wheels 10, 10 cannot be blocked. Accordingly, if the gear change ratio is rapidly increased in a state that the engine 1 and the CVT 3 are connected for the power transmission as in the power transmission apparatus shown in FIG. 8, the torque is possibly transmitted to the drive wheels due to the gear change, or the torque that is transmitted to the drive wheels 10, 10 is possibly changed.

Figure 10:
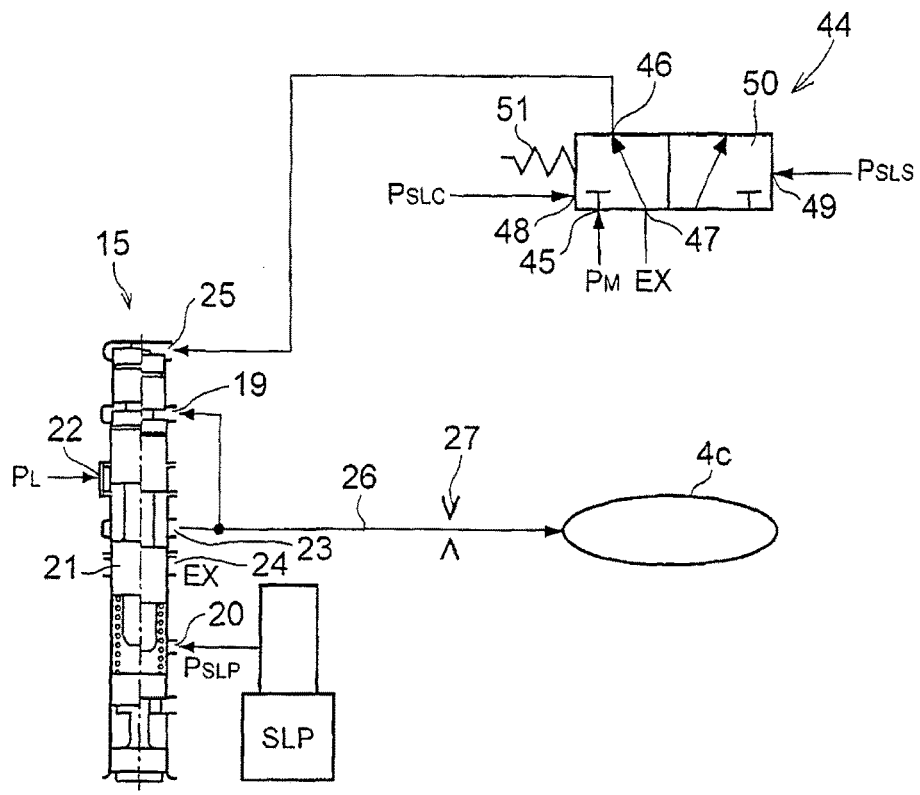
FIG. 10 is a view for illustrating an example of the configuration of the hydraulic control device that controls the hydraulic pressure of the hydraulic actuator shown in FIG. 9.

Considering the above, the hydraulic control device shown in FIG. 10 can increase the amount of the oil that is discharged from the hydraulic actuator 4c in accordance with the signal pressure $P_{SLC}$ for controlling the clutch C1 that is disengaged when the power transmission apparatus is brought into the neutral state as shown in FIG. 9. The components of the hydraulic control device shown in FIG. 10 that are the same as those shown in FIG. 6 are denoted by the same reference numerals, and the description thereof will not be repeated. In the hydraulic control device shown in FIG. 10, the switching valve 44 is switched in accordance with the signal pressure $P_{SLC}$ that is output to control the engaging pressure of the clutch C1 and the signal pressure $P_{SLS}$ that is applied (supplied) to the second control valve 16 for controlling the hydraulic pressure of the hydraulic actuator 4c. More specifically, the signal pressure $P_{SLC}$ that is output from the solenoid valve SLC is applied (supplied) to the first pilot port 48, and the signal pressure $P_{SLS}$ that is output from the solenoid valve SLS is applied (supplied) to the second pilot port 49.

Then, when the signal pressure $P_{SLC}$ that is output from the solenoid valve SLC to block the power transmission between the engine 1 and the drive wheels 10, 10 is lowered, the spool 50 moves to the left side in FIG. 10, and the modulator pressure $P_M$ is applied (supplied) to the pilot port 25 in the first control valve 15. On the contrary, when the clutch C1 is engaged to enable the power transmission between the engine 1 and the drive wheels 10, 10, the relatively high signal pressure $P_{SLC}$ is applied (supplied) to the switching valve 44 from the solenoid valve SLC. Then, the spool 50 moves to the right side in FIG. 10, and the oil is discharged from the pilot port 25 in the first control valve 15. Here, even during downshifting, the hydraulic pressure of the hydraulic actuator 6c is maintained at predetermined pressure or higher so as to prevent the slippage of the belt 7 in the circumferential direction. The clutch C1 in FIG. 9 can be regarded as the third clutch and the sixth clutch in the present invention. The solenoid valve SLC can be regarded as a second control valve and a fifth control valve in the present invention. The signal pressure $P_{SLC}$ can be regarded as fifth signal pressure and tenth signal pressure in the present invention.

Accordingly, in the hydraulic control device that is configured as shown in FIG. 10, when the clutch C1 is disengaged during the stop of the vehicle or during the rapid deceleration of the vehicle, the switching valve 44 is switched, and the modulator pressure $P_M$ is thereby applied (supplied) to the first control valve 15. Because the spool 21 in the first control valve 15 then moves to communicate between the output port 23 and the drain port 24, the oil in the hydraulic actuator 4c can be discharged without relying on the hydraulic pressure of the hydraulic actuator 4c. While the oil in the hydraulic actuator 4c is discharged, the discharge amount thereof can be increased. In other words, the amount of the oil that is discharged from the hydraulic actuator can be increased by lowering the hydraulic pressure of the hydraulic actuator 4c without relying on the pressure regulating action by the first control valve 15. As a result, because the gear change ratio can be changed to one that is set for restart in the early stage after the rapid deceleration or after the temporary stop of the vehicle, it is possible to suppress or prevent shortage of the torque or degradation in the acceleration response during restart. In addition, during the normal travel in which the torque that is output from the engine 1 is transmitted to the drive wheels 10, 10, the oil is discharged from the pilot port 25 in the first control valve 15 by engaging the clutch C1. Therefore, the hydraulic pressure of the hydraulic actuator 4c can be controlled in accordance with the signal pressure $P_{SLP}$ during the normal travel.

Figure 11:
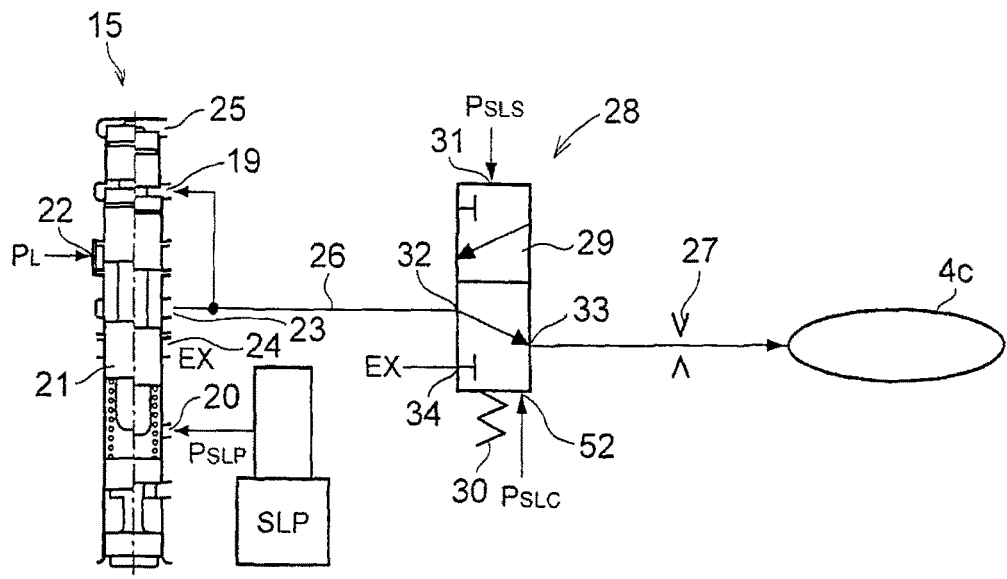
FIG. 11 is a view for illustrating another example of the configuration of the hydraulic control device that controls the hydraulic pressure of the hydraulic actuator shown in FIG. 9.

In addition, as in the hydraulic control device shown in FIG. 10, a switching valve that is switched on the basis of the signal pressure $P_{SLS}$ output from the solenoid valve SLS and the signal pressure $P_{SLC}$ output from the solenoid valve SLC is provided in the oil passage 26 in the similar manner as in FIG. 7 above. In other words, the amount of the oil that is discharged from the hydraulic actuator 4c can be increased as in FIG. 10 by providing the switching valve between the orifice 27 and the first control valve 15. Such a configuration is shown in FIG. 11. In the hydraulic control device shown in FIG. 11, the same components as those in the hydraulic control device shown in FIG. 7 are denoted by the same reference numerals, and the description thereof will not be repeated. In the hydraulic control device shown in FIG. 11, the signal pressure $P_{SLS}$ that is output from the solenoid valve SLS is applied (supplied) to the pilot port 31 of the switching valve 28, and the signal pressure $P_{SLC}$ that is output from the solenoid valve SLC is applied (supplied) to the pilot port 52.

In the hydraulic control device shown in FIG. 11 described above, when the signal pressure $P_{SLC}$ that is output from the solenoid valve SLC for disengagement of the clutch C1 is lowered, the spool 29 moves to the lower side in FIG. 11, and the oil in the hydraulic actuator 4c is discharged. While the oil in the hydraulic actuator 4c is discharged, the communication between the first control valve 15 and the hydraulic actuator 4c is blocked. In addition, because the clutch C1 is engaged when the torque is transmitted from the engine 1 to the drive wheels 10, 10, the signal pressure $P_{SLC}$ that is applied to the spool 29 is increased, the spool 29 moves to the upper side in FIG. 11, and the hydraulic actuator 4c is communicated with the first control valve 15.

Accordingly, in the hydraulic control device shown in FIG. 11, the oil in the hydraulic actuator 4c can be discharged without relying on the hydraulic pressure of the hydraulic actuator 4c. While the oil in the hydraulic actuator 4c is discharged, the discharge amount thereof can be increased. In other words, the amount of the oil that is discharged from the hydraulic actuator can be increased by lowering the hydraulic pressure of the hydraulic actuator 4c without relying on the pressure regulating action by the first control valve 15. Therefore, because the gear change ratio can be changed to one that is set for restart in the early stage after the rapid deceleration or after the temporary stop of the vehicle, it is possible to suppress or prevent shortage of the torque or degradation in the acceleration response during restart. In addition, when the clutch C1 is engaged during the normal travel in which the torque that is output from the engine 1 is transmitted to the drive wheels 10, 10, the hydraulic actuator 4c can be communicated to the first control valve 15. Furthermore, when the hydraulic actuator 4c is communicated with the first control valve 15, the drain port 34 in the switching valve 28 can be blocked. Therefore, the hydraulic pressure of the hydraulic actuator 4c can be controlled in accordance with the signal pressure $P_{SLP}$ during the normal travel.

When a driver operates the shift lever and the power transmission apparatus is brought into the neutral state, the clutch C1 is disengaged in the power transmission apparatus shown in FIG. 9. In other words, the signal pressure $P_{SLC}$ that is output from the solenoid valve SLC is lowered. Accordingly, when the hydraulic control device is configured as shown in FIG. 10 or FIG. 11, the switching valve 44 (28) is switched so as to increase the discharge amount of the oil from the hydraulic actuator 4c. More specifically, in the example shown in FIG. 10, the switching valve 44 is switched such that the modulator pressure $P_M$ is (supplied) to the pilot port 25 in the first control valve 15, and in the example shown in FIG. 11, the switching valve 28 is switched such that the hydraulic actuator 4c is communicated with the oil pan 11. Thus, when the power transmission apparatus is brought into the neutral state during the normal travel, the amount of the oil that is discharged from the hydraulic actuator 4c is possibly increased to cause downshifting, and a shock possibly occurs when the clutch C1 is engaged again for acceleration. Considering the above, the hydraulic control devices shown in FIG. 12 and FIG. 13 can suppress or prevent switching of the switching valve 44 (28) when the power transmission apparatus is simply brought into the neutral state. That is, FIG. 12 and FIG. 13 show the hydraulic control devices in which the gear can be changed only when a signal indicative of a gear change is output.

First, a description will be made on a configuration of the hydraulic control device shown in FIG. 12. In the hydraulic control device of FIG. 12, the same components as those in FIG. 10 are denoted by the same reference numerals, and the description thereof will not be repeated. The hydraulic control device shown in FIG. 12 is formed with a pilot port 55 in the switching valve 44 such that a load that is based on the signal pressure $P_{SLP}$ output from the solenoid valve SLP exerts on the spool 50 in a same direction as a direction of the load that presses the spool 50 when the signal pressure $P_{SLC}$ output from the solenoid valve SLC is applied (supplied) thereto. In addition, a pressure-applied area of the spool 50 to which the signal pressure $P_{SLP}$ output from the solenoid valve SLP is applied is formed to be smaller than a pressure-applied area of the spool to which the signal pressure $P_{SLS}$ output from the solenoid valve SLS is applied. In the hydraulic control device shown in FIG. 12, when the clutch C1 is disengaged to lower the signal pressure $P_{SLC}$ that is applied (supplied) to the switching valve 44 and also to lower the signal pressure $P_{SLP}$, the spool 50 moves to the left side in FIG. 12, and the modulator pressure $P_M$ is applied (supplied) to the pilot port 25.

Figure 12:
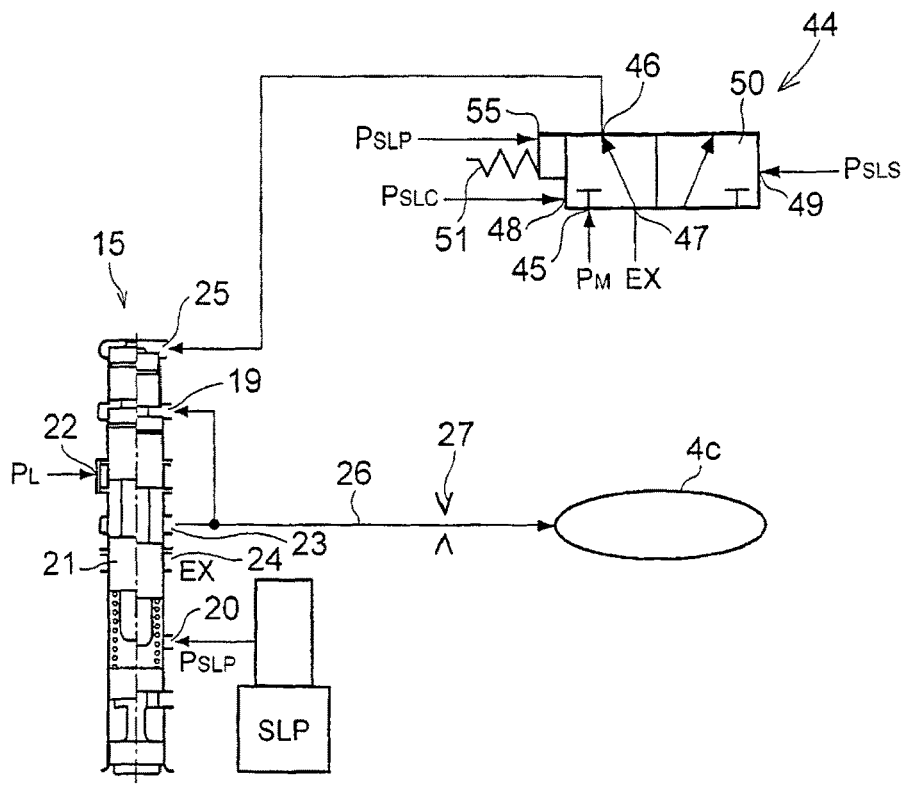
FIG. 12 is a view for illustrating the configuration of the hydraulic control device that can control the hydraulic pressure of the hydraulic actuator shown in FIG. 9 without being influenced by pressure of a secondary pulley.
Figure 13:
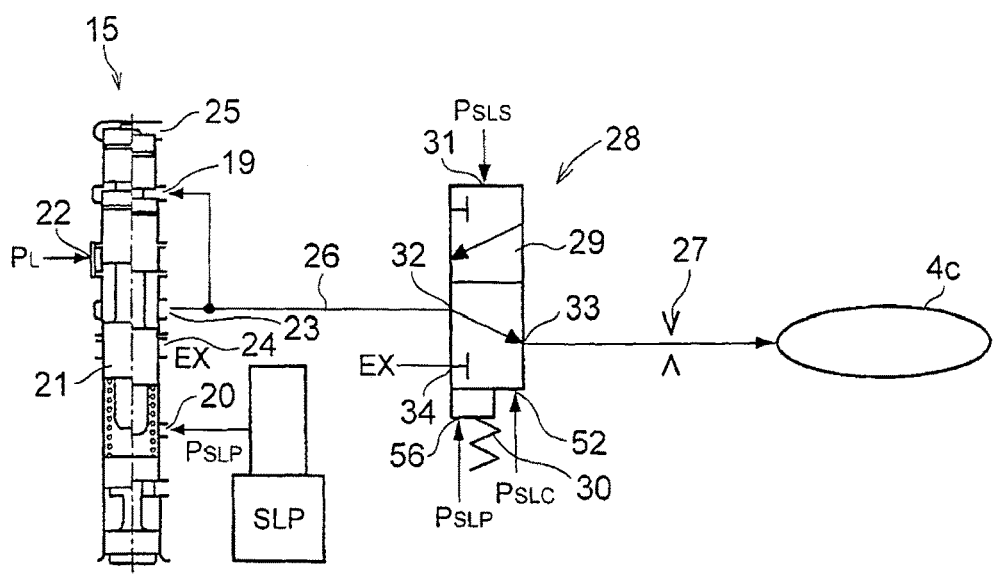
FIG. 13 is a view for illustrating another example of the configuration of the hydraulic control device that can control the hydraulic pressure of the hydraulic actuator shown in FIG. 9 without being influenced by the pressure of the secondary pulley.

Accordingly, similar to FIG. 10, in the hydraulic control device shown in FIG. 12, the clutch C1 is disengaged during the stop of the vehicle or during the rapid deceleration of the vehicle, the switching valve 44 is switched by lowering the signal pressure $P_{SLP}$ for downshifting, and the modulator pressure $P_M$ is applied (supplied) to the first control valve 15. In other words, the switching valve 44 can be switched in accordance with the signal pressure $P_{SLP}$ for downshifting. Thus, the spool 21 in the first control valve 15 moves to communicate the output port 23 with the drain port 24 without relying on the hydraulic pressure of the hydraulic actuator 4c, and thus the oil in the hydraulic actuator 4c can be discharged. While the oil in the hydraulic actuator 4c is discharged, the discharge amount thereof can be increased. In other words, the amount of the oil that is discharged from the hydraulic actuator can be increased by lowering the hydraulic pressure of the hydraulic actuator 4c without relying on the pressure regulating action by the first control valve 15. As a result, because the gear change ratio can be changed to one that is set for restart in the early stage after the rapid deceleration or after the temporary stop of the vehicle, it is possible to suppress or prevent shortage of the torque or degradation in the acceleration response during restart. In addition, even when the power transmission apparatus is brought into the neutral state during the normal travel, the signal pressure $P_{SLP}$ output from the solenoid valve SLP is exerted on the spool 50 in the opposite direction of the signal pressure $P_{SLS}$ output from the solenoid valve SLS. Accordingly, the loads that exert on the spool 50 can be canceled. As a result, it is possible to suppress or prevent the modulator pressure $P_M$ from being exerted on the pilot port 25 in the first control valve 15 during the normal travel. In other words, normal gear change control can be executed during the normal travel.

Next, a description will be made on a configuration of the hydraulic control device shown in FIG. 13. In the hydraulic control device shown in FIG. 13, the same components as those in FIG. 11 are denoted by the same reference numerals, and the description thereof will not be repeated. The hydraulic control device shown in FIG. 13 is formed with a pilot port 56 in the switching valve 28 such that the load that is based on the signal pressure $P_{SLP}$ output from the solenoid valve SLP exerts on the spool 29 in the same direction as a load that presses the spool 29 when the signal pressure $P_{SLC}$ output from the solenoid valve SLC is applied (supplied) thereto. In addition, a pressure-applied area of the spool 29 to which the signal pressure $P_{SLP}$ output from the solenoid valve SLP is applied is formed to be smaller than a pressure-applied area of the spool 29 to which the signal pressure $P_{SLS}$ output from the solenoid valve SLS is applied. Then, in the hydraulic control device shown in FIG. 13, the clutch C1 is disengaged, the spool 29 moves to the lower side in FIG. 13 by lowering the signal pressure $P_{SLP}$, and the oil in the hydraulic actuator 4c is discharged to the oil pan 11.

Accordingly, similar to FIG. 11, in the hydraulic control device shown in FIG. 13, the clutch C1 is disengaged during the stop of the vehicle or during the rapid deceleration of the vehicle, and the oil in the hydraulic actuator 4c is discharged from the switching valve 28 by lowering the signal pressure $P_{SLP}$ for downshifting. In other words, the switching valve 28 can be switched in accordance with the signal pressure $P_{SLP}$ for downshifting. Thus, the oil in the hydraulic actuator 4c can be discharged without relying on the hydraulic pressure of the hydraulic actuator 4c. While the oil in the hydraulic actuator 4c is discharged, the discharge amount thereof can be increased. In other words, the amount of the oil that is discharged from the hydraulic actuator can be increased by lowering the hydraulic pressure of the hydraulic actuator 4c without relying on the pressure regulating action by the first control valve 15. As a result, because the gear change ratio can be changed to one that is set for restart in the early stage after the rapid deceleration or after the temporary stop of the vehicle, it is possible to suppress or prevent shortage of the torque or degradation in the acceleration response during restart. In addition, even when the power transmission apparatus is brought into the neutral state during the normal travel, the signal pressure $P_{SLP}$ output from the solenoid valve SLP is exerted on the spool 29 in the opposite direction of the signal pressure $P_{SLS}$ output from the solenoid valve SLS. Accordingly, the loads that exert on the spool 29 can be canceled. As a result, it is possible to suppress or prevent the hydraulic actuator 4c from being communicated with the oil pan 11 or the input port 32 of the switching valve 28 from being blocked during the normal travel. In other words, the normal gear change control can be executed during the normal travel.

Figure 14:
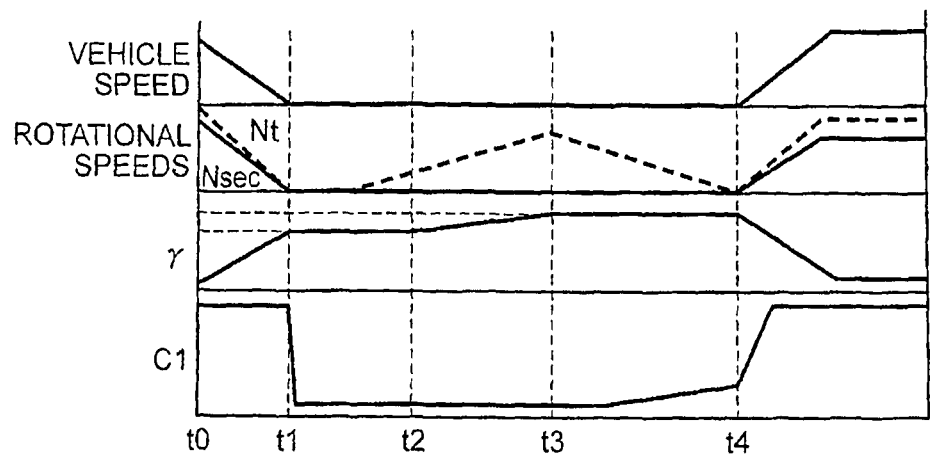
FIG. 14 is a time chart for illustrating changes in a vehicle speed, a turbine rotational speed, a rotational speed of the secondary pulley, a gear change ratio, and engaging pressure of the clutch when the hydraulic pressure of the hydraulic actuator is controlled by the hydraulic control device in any one of FIG. 10 to FIG. 13.

FIG. 14 shows changes in a turbine rotational speed Nt, a rotational speed Nsec of the secondary pulley, the gear change ratio, the engaging pressure of the clutch C1, and the like in a case where the power transmission apparatus configured as FIG. 9 is controlled by the hydraulic control device shown in any one of FIG. 10 to FIG. 13. A horizontal axis in FIG. 14 represents time. In a graph that shows the turbine rotational speed Nt and the rotational speed Nsec of the secondary pulley in FIG. 14, a broken line indicates the turbine rotational speed Nt while a solid line indicates the rotational speed Nsec of the secondary pulley. From time t0 to time t1 in FIG. 14, the vehicle speed is reduced, and the gear change ratio is increased. In other words, the hydraulic pressure of the hydraulic actuator 4c is lowered (discharged) by the normal gear change control, and the gear change ratio is thereby increased. Accordingly, in an example shown in FIG. 14, the vehicle speed is reduced, and the rotational speed Nsec of the secondary pulley is reduced at a same change rate as a change rate of the vehicle speed. The turbine rotational speed Nt is also reduced while the turbine rotational speed Nt is maintained to be higher than the rotational speed Nsec of the secondary pulley in accordance with the gear change ratio of the CVT 3. The gear change ratio is increased so as to correspond to the gear change ratio at which the vehicle speed is increased again after being reduced. Meanwhile, the engaging pressure of the clutch C1 is maintained to be constant; and the clutch C1 is engaged.

When the vehicle is stopped at the time t1, both of the turbine rotational speed Nt and the rotational speed Nsec of the secondary pulley become 0. Meanwhile, in the example shown in FIG. 14, as indicated by a broken line in the graph that shows the change in the gear change ratio, the actual gear change ratio is not changed up to the gear change ratio that is set when the vehicle is restarted. In the example shown in FIG. 14, if the gear change ratio is not increased to the target gear change ratio at the time t1, the clutch C1 is disengaged to forcibly change the gear change ratio. Accordingly, because the engaging pressure of the clutch C1 is lowered, the turbine rotational speed Nt starts increased.

Once the engaging pressure of the clutch C1 is lowered, the gear change ratio starts being increased (time t2). This occurs because the signal pressure $P_{SLC}$ for engagement of the clutch C1 is lowered and thus the oil in the hydraulic actuator 4c is forcibly discharged. When the gear change ratio starts increased at the time t2 and the actual gear change ratio is increased to the target gear change ratio (time t3), the clutch C1 starts being engaged. Consequently, the turbine rotational speed Nt starts being reduced. It is determined that the clutch C1 is engaged when the turbine rotational speed Nt is reduced to 0, and the engaging pressure of the clutch C1 starts being increased to the maximum (time t4). In the example shown in FIG. 14, the vehicle starts traveling at the same time as the clutch C1 is engaged, the vehicle speed starts increasing at the time t4, and the turbine rotational speed Nt and the rotational speed Nsec of the secondary pulley start increased. Meanwhile, the gear change ratio is lowered in accordance with the vehicle speed.

In each of the hydraulic control devices described above, the amount of the oil discharged from the hydraulic actuator may be increased when a shift range is in a P (parking) range or an N (neutral) range. Similarly, the amount of the oil discharged from the hydraulic actuator may be increased during the parking even when the shift range is in a D (drive) range or an R (reverse) range. Furthermore, as for a case of the hydraulic control device that controls the power transmission apparatus shown in FIG. 5 or FIG. 8 as the subject, the power transmission device can be brought into the neutral state by disengaging the clutch C2 and the dog clutch D1. Accordingly, in such a case, when the vehicle travels in the D (drive) range or the R (reverse) range, the clutch C2 and the dog clutch D1 may be disengaged to increase the amount of the oil to be discharged from the hydraulic actuator. Moreover, as for the hydraulic control device that controls the power transmission apparatus shown in FIG. 9 as the subject, the power transmission device is brought into the neutral state when the amount of the oil discharged from the hydraulic actuator is increased. Thus, the amount of the oil discharged from the hydraulic actuator may be increased even during the traveling.

In the examples described above, the description has been made on the configuration in which the amount of the oil discharged from the hydraulic actuator is increased during the rapid deceleration or during the stop of the vehicle to improve the gear change speed for downshifting. However, the gear change speed for downshifting can be improved similarly by increasing the amount of the oil discharged from the hydraulic actuator even during the traveling. When the amount of the oil discharged from the hydraulic actuator is increased for the gear change, the gear change ratio is not limited to one that is set for restart but may be changed to any gear change ratio. In addition, the belt-type continuously variable transmission as the subject of the present invention may include the hydraulic actuator that exerts a pressing force on the primary pulley. A device that exerts the thrust on the secondary pulley is not limited to the hydraulic actuator. Therefore, other than the hydraulic control device that increases the amount of the oil discharged from the hydraulic actuator on the basis of the signal pressure applied (supplied) to the second control valve, the belt-type continuously variable transmission that includes an electromagnetic actuator or a torque cam may be used as a device that exerts the thrust on the secondary pulley.

According to the present invention, the hydraulic pressure control valve is configured to regulate the predetermined source pressure to be the gear-change hydraulic pressure for setting or changing the gear change ratio and to control the hydraulic pressure of the first hydraulic actuator. When the hydraulic pressure of the first hydraulic actuator is changed rapidly for the gear change, it is configured to apply the hydraulic pressure to or lowers the hydraulic pressure of the first hydraulic actuator without relying on the pressure regulating action by a first hydraulic pressure control valve. Accordingly, because the hydraulic pressure of the first hydraulic actuator can be changed rapidly, it is possible to increase the gear change speed for the gear change ratio that corresponds to the hydraulic pressure of the first hydraulic actuator. Thus, the gear change ratio can be changed in the early stage to one that is set when the vehicle speed is rapidly changed or to one that is set for restart after the temporary stop of the vehicle. Therefore, it is possible to suppress or prevent excess or shortage of the output torque or degradation in the acceleration response when the vehicle speed is rapidly changed or when the vehicle is restarted after the temporary stop.

In addition, because the second signal pressure is exerted on the first pressure regulator valve that is configured to increase or decrease the hydraulic pressure of the first hydraulic actuator with the first signal pressure and the feedback pressure to be applied thereto, either the first signal pressure or the feedback pressure of the first pressure regulator valve is canceled. Accordingly, it is possible to apply the hydraulic pressure to or lowers the hydraulic pressure of the first hydraulic actuator without relying on the pressure regulating action by the first pressure regulator valve, and the hydraulic pressure of the first hydraulic actuator can be changed rapidly. Thus, it is possible to increase the gear change speed for the gear change ratio that corresponds to the hydraulic pressure of the first hydraulic actuator. As a result, the gear change ratio can be changed in the early stage to one that is set when the vehicle speed is rapidly changed or to one that is set for restart after the temporary stop of the vehicle. Therefore, it is possible to suppress or prevent excess or shortage of the output torque or degradation in the acceleration response when the vehicle speed is rapidly changed or when the vehicle is restarted after the temporary stop.

Furthermore, when the first oil passage includes the second switching valve, it is possible to apply the hydraulic pressure to or lower the hydraulic pressure of the first hydraulic actuator without using the hydraulic control valve. The first oil passage is communicated with the hydraulic pressure control valve and the first hydraulic actuator. The second switching valve switches the oil passage when the seventh signal pressure is applied thereto. The second switching valve applies the hydraulic pressure to or lowers the hydraulic pressure of the first hydraulic actuator. Accordingly, it is possible to apply the hydraulic pressure to or lower the hydraulic pressure of the first hydraulic actuator without relying on the pressure regulating action by the hydraulic pressure control valve, and the hydraulic pressure of the first hydraulic actuator can be changed rapidly. Thus, it is possible to increase the gear change speed for the gear change ratio that corresponds to the hydraulic pressure of the first hydraulic actuator. As a result, the gear change ratio can be changed in the early stage to one that is set when the vehicle speed is rapidly changed or to one that is set for restart after the temporary stop of the vehicle. Therefore, it is possible to suppress or prevent excess or shortage of the output torque or degradation in the acceleration response when the vehicle speed is rapidly changed or when the vehicle is restarted after the temporary stop.

The clutch is included that can be engaged even when the power transmission between the power source and the drive wheel is blocked, and it is configured that the signal pressure is applied to the first pressure regulator valve or the second switching valve is switched in accordance with the signal pressure output for engagement of the clutch. Due to this configuration, when the hydraulic pressure is applied to the first hydraulic actuator or the hydraulic pressure of the first hydraulic actuator is lowered without relying on the pressure regulating action by the hydraulic pressure control valve or the first pressure regulator valve, it is possible to increase the gear change speed and also to suppress or prevent the torque from being transmitted to the drive wheel due to the gear change.

Moreover, the clutch is included that is engaged to enable the power transmission between the power source and the drive wheel. When the signal pressure for engaging the clutch is lowered, the signal pressure is applied to the first pressure regulator valve, or the second switching valve is switched. Due to the above, when it is configured to apply the hydraulic pressure to or lower the hydraulic pressure of the first hydraulic actuator without relying on the pressure regulating action by hydraulic pressure control valve or the first pressure regulator valve, it is possible to suppress or prevent the torque from being transmitted to the drive wheel that is caused by changing the hydraulic pressure of the first hydraulic actuator for the gear change.

It is also configured to apply the hydraulic pressure to or lower the hydraulic pressure of the first hydraulic actuator, without relying on the pressure regulating action by the hydraulic pressure control valve or the first pressure regulator valve, in accordance with the signal pressure that is output to control the hydraulic pressure of the hydraulic actuator attached to the other pulley, the signal pressure that is output to control the hydraulic pressure of the first hydraulic actuator, and the signal pressure that is output to engage the clutch for allowing the power transmission between the power source and the drive wheel when being engaged. Due to such a configuration, the clutch is disengaged, and it is possible to suppress or prevent application of the hydraulic pressure to or lowering of the hydraulic pressure of the first hydraulic actuator without relying on the pressure regulating action by the hydraulic pressure control valve or first pressure regulator valve. In other words, it is possible to apply the hydraulic pressure to or lower the hydraulic pressure of the first hydraulic actuator, without relying on the pressure regulating action by the hydraulic pressure control valve or the first pressure regulator valve, in accordance with the signal pressure for the gear change.

In the above examples, each of the primary pulley and the secondary pulley respectively includes the conical fixed sheave 4a, the conical movable sheave 4b, the conical movable sheave 6a and the conical fixed sheave 6b. The belt 7 is wound around the grooves formed in the fixed sheave 4a and the movable sheave 4b. However, the present invention may use another configuration. More specifically, each of the primary pulley and the secondary pulley is formed of a conical friction wheel, and a pair of the friction wheels are disposed such that a large diameter side and a small diameter side thereof are opposed from each other. The belt 7 is wound around both of the friction wheels. The present invention may be adopted for the thus-configured pulleys.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

The invention claimed is:

1. A belt-type continuously variable transmission, comprising:
    paired pulleys, each having a belt groove around which a belt is wound;
    a first hydraulic actuator that is provided to either one of the paired pulleys and reduces a width of the belt groove when hydraulic pressure is applied thereto;
    a hydraulic pressure control valve that regulates predetermined source pressure to be gear-change hydraulic pressure for setting or changing a gear change ratio and outputs the gear-change hydraulic pressure to the first hydraulic actuator through a fluid passage; and
    gear change equipment that applies a hydraulic pressure to the first hydraulic actuator through the fluid passage or lowers a hydraulic pressure of the first hydraulic actuator without regulating the source pressure to be the gear-change hydraulic pressure by the hydraulic pressure control valve when the hydraulic pressure of the first hydraulic actuator is changed rapidly to change the width of the belt groove in the one pulley,
    wherein:
    the hydraulic pressure control valve includes a first pressure regulator valve that applies the hydraulic pressure to or lowers the hydraulic pressure of the first hydraulic actuator in accordance with first signal pressure and feedback pressure of the first hydraulic actuator that are applied thereto, and
    the gear change equipment includes signal pressure applying equipment that exerts second signal pressure in a direction to increase or lower the feedback pressure applied to the first pressure regulator valve and applies the hydraulic pressure to or lowers the hydraulic pressure of the first hydraulic actuator without regulating the source pressure to be the gear-change hydraulic pressure by the hydraulic pressure control valve.

2. The belt-type continuously variable transmission according to claim 1 wherein:
    the hydraulic pressure of the first hydraulic actuator is rapidly changed to change the width of the belt groove in the one pulley when a speed to change the gear change ratio is increased.

3. The belt-type continuously variable transmission according to claim 1 wherein:
    the signal pressure applying equipment includes a first switching valve that is configured to rapidly change the hydraulic pressure of the first hydraulic actuator so as to change the width of the belt groove in the one pulley and thereby switch an oil passage communicated to the first pressure regulator valve to exert the second signal pressure on the first pressure regulator valve.

4. The belt-type continuously variable transmission according to claim 3 further comprising:
    a first clutch that is configured be engaged even when power transmission between a power source and a drive wheel is blocked; and
    a first control valve that outputs fourth signal pressure for engaging the first clutch wherein:
    the first switching valve exerts the second signal pressure on the first pressure regulator valve when the fourth signal pressure is increased.

5. The belt-type continuously variable transmission according to claim 4 wherein:
    the first switching valve exerts the second signal pressure on the first pressure regulator valve in accordance with the first signal pressure and the fourth signal pressure.

6. The belt-type continuously variable transmission according to claim 4 wherein:
    the first clutch includes a second clutch that is engaged during start of a vehicle and allows power transmission between the power source and the drive wheel without interposing the belt therebetween.

7. The belt-type continuously variable transmission according to claim 3 further comprising:
    a third clutch that is engaged to allow power transmission between a power source and a drive wheel; and
    a second control valve that outputs fifth signal pressure for engaging the third clutch wherein:
    the first switching valve exerts the second signal pressure on the first pressure regulator valve when the fifth signal pressure is lowered.

8. The belt-type continuously variable transmission according to claim 7 comprising:
    a second hydraulic actuator that is provided in another pulley of the paired pulleys and reduces the width of the belt groove when being applied with the hydraulic pressure; and
    a third control valve that outputs sixth signal pressure for controlling the hydraulic pressure of the second hydraulic actuator wherein:
    the first switching valve exerts the second signal pressure on the first pressure regulator valve in accordance with the fifth signal pressure and the sixth signal pressure.

9. The belt-type continuously variable transmission according to claim 8 wherein:
    the first switching valve exerts the second signal pressure on the first pressure regulator valve in accordance with the first signal pressure, the fifth signal pressure, and the sixth signal pressure.

10. The belt-type continuously variable transmission according to claim 1 wherein:
    the gear change equipment includes a second switching valve that is provided in a first oil passage communicated with the hydraulic pressure control valve and the first hydraulic actuator, and that, when the hydraulic pressure of the first hydraulic actuator is changed rapidly to change the width of the belt groove in the one pulley, switches an oil passage communicated to the first hydraulic actuator when seventh signal pressure is applied thereto, and applies the hydraulic pressure to or lowers the hydraulic pressure of the first hydraulic actuator.

11. The belt-type continuously variable transmission according to claim 10 further comprising:

a fourth clutch that is configured to be engaged even when power transmission between a power source and a drive wheel is blocked; and a fourth control valve that outputs eighth signal pressure for engaging the fourth clutch wherein:

the second switching valve applies the hydraulic pressure to or lowers the hydraulic pressure of the first hydraulic actuator when the eighth signal pressure is increased.

12. The belt-type continuously variable transmission according to claim 11 further comprising:

a second pressure regulator valve that outputs ninth signal pressure for applying the hydraulic pressure to and lowering the hydraulic pressure of the first hydraulic actuator wherein:

the second switching valve applies the hydraulic pressure to or lowers the hydraulic pressure of the first hydraulic actuator in accordance with the eighth signal pressure and the ninth signal pressure.

13. The belt-type continuously variable transmission according to claim 11 wherein:

the fourth clutch includes a fifth clutch that is engaged during start of a vehicle and allows the power transmission between the power source and the drive wheel without interposing the belt therebetween.

14. The belt-type continuously variable transmission according to claim 10 further comprising:

a sixth clutch that is engaged to allow power transmission between a power source and a drive wheel; and a fifth control valve that outputs tenth signal pressure for engaging the sixth clutch wherein:

the second switching valve applies the hydraulic pressure to or lowers the first hydraulic pressure of the hydraulic actuator when the tenth signal pressure is lowered.

15. The belt-type continuously variable transmission according to claim 14 comprising:

a third hydraulic actuator that is provided in another pulley of the paired pulleys and reduces the width of the belt groove when the hydraulic pressure is applied thereto; and a sixth control valve that outputs eleventh signal pressure for controlling the hydraulic pressure of the third hydraulic actuator wherein:

the second switching valve applies the hydraulic pressure to or lowers the hydraulic pressure of the first hydraulic actuator in accordance with the tenth signal pressure and the eleventh signal pressure.

16. The belt-type continuously variable transmission according to claim 15 further comprising:

a third pressure regulator valve that outputs twelfth signal pressure for applying the hydraulic pressure to or lowering the hydraulic pressure of the first hydraulic actuator wherein:

the second switching valve applies the hydraulic pressure to or lowers the hydraulic pressure of the first hydraulic actuator in accordance with the tenth signal pressure, the eleventh signal pressure, and the twelfth signal pressure.

* * * * *